(12) United States Patent
Moriwaki et al.

(10) Patent No.: US 6,661,483 B1
(45) Date of Patent: Dec. 9, 2003

(54) LIQUID CRYSTAL DISPLAY DEVICE

(75) Inventors: Hiroyuki Moriwaki, Nara (JP); Mitsuhiro Tanaka, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 7 days.

(21) Appl. No.: 09/620,731

(22) Filed: Jul. 20, 2000

(30) Foreign Application Priority Data

Jul. 21, 1999 (JP) ......................................... P11-206732

(51) Int. Cl.$^7$ ............................................. G02F 1/1335

(52) U.S. Cl. ........................ 349/102; 349/117; 349/113

(58) Field of Search ................................ 349/113, 117, 349/119, 115, 112, 162, 99, 98, 181, 102

(56) References Cited

U.S. PATENT DOCUMENTS

| 4,398,805 A | * | 8/1983 | Cole .......................... 350/345 |
| 5,361,151 A | * | 11/1994 | Sonehara et al. ........... 349/117 |

(List continued on next page.)

FOREIGN PATENT DOCUMENTS

| GB | 2 292 814 A | 3/1996 |
| JP | 4-97121 | 3/1992 |
| JP | A 4-289818 | 10/1992 |
| JP | A 5-27254 | 2/1993 |
| JP | A 6-95093 | 4/1994 |
| JP | 6-337414 | 12/1994 |
| JP | 7-84252 | 3/1995 |
| JP | A 7-114031 | 5/1995 |
| JP | 7-146469 | 6/1995 |
| JP | A 8-76148 | 3/1996 |
| JP | 9-43596 | 2/1997 |
| JP | A 9-90349 | 4/1997 |
| JP | 9-292610 | 11/1997 |
| JP | A 10-31211 | 2/1998 |
| JP | 10-123505 | 5/1998 |
| JP | 10-161110 | 6/1998 |
| JP | 10-170906 | 6/1998 |
| JP | 10-232390 | 9/1998 |
| JP | A 10-333175 | 12/1998 |
| JP | A 11-44890 | 2/1999 |

OTHER PUBLICATIONS

Yamaguchi et al, article P43, SID DIG 1997, pp. 647–650, May 1997.*
Iwai et al, article 16.3, SID DIG 1998, pp. 225–226, May 1998.*
Ogawa et al, SID DIG 1998, article 16.1, pp. 217–220, May 1998.*
Communication, European Search Report from European Patent Office, 11.10.2002, 3 pp.
Copy of Notification of Reason for Refusal (Mar. 25, 2003) for Japanese Patent Application No.: 11–20632.

*Primary Examiner*—Kenneth Parker
(74) *Attorney, Agent, or Firm*—Edwards & Angell, LLP; David G. Conlin; George W. Hartnell, III

(57) ABSTRACT

An object of the invention is to prevent color shifting which occurs in a liquid crystal display device in a white display state as well as in a black display state. The liquid crystal display device includes a single polarization layer, a single phase retardation layer, a reflective layer, and a liquid crystal layer, and produces a display by utilizing light reflected from the reflective layer. Based on the wavelength $\lambda$ of incident light, the retardation value ReF of the phase retardation layer is set approximately equal to $(1/4+K/2) \lambda$, and the retardation value ReL of the liquid crystal layer is set approximately equal to $(1/2+L/2)\lambda$ (K=0, 1, 2, . . . : L=0, 1, 2, . . . ). The angle $\Delta\phi$ that the absorption axis of the polarization layer makes with the retardation axis of the phase retardation layer is set as $0°<\Delta\phi<45°$ or $45°<\Delta\phi<90°$. This prevents the color shifting in the white display state as well as in the black display state in the liquid crystal display device, and improves the contrast.

16 Claims, 11 Drawing Sheets

U.S. PATENT DOCUMENTS

| | | | |
|---|---|---|---|
| 5,612,803 A | | 3/1997 | Yamada et al. ............. 349/188 |
| 5,619,356 A | * | 4/1997 | Kozo et al. ................... 349/99 |
| 5,642,214 A | | 6/1997 | Ishii et al. .................... 349/96 |
| 5,684,551 A | * | 11/1997 | Nakamura et al. ............ 349/99 |
| 5,715,028 A | * | 2/1998 | Abileah et al. ............. 349/162 |
| 5,729,318 A | | 3/1998 | Yamada et al. ............. 349/156 |
| 5,734,455 A | * | 3/1998 | Yoshida et al. ............... 349/99 |
| 5,737,046 A | * | 4/1998 | Moriwaki et al. .......... 349/117 |
| 5,739,889 A | | 4/1998 | Yamada et al. ............. 349/156 |
| RE35,799 E | | 5/1998 | Sonehara et al. ............. 349/98 |
| 5,751,382 A | | 5/1998 | Yamada et al. ............... 349/12 |
| 5,838,408 A | * | 11/1998 | Inoue et al. ................ 349/118 |
| 5,920,367 A | | 7/1999 | Kajimoto et al. |
| 5,933,207 A | * | 8/1999 | Wu .............................. 349/99 |
| 5,953,090 A | * | 9/1999 | Ozeki et al. ................... 345/88 |
| 5,986,730 A | * | 11/1999 | Hansen et al. ................ 349/96 |
| 6,025,899 A | | 2/2000 | Fukunaga et al. .......... 349/115 |
| 6,124,919 A | * | 9/2000 | Kubo et al. ................. 349/162 |
| 6,130,735 A | * | 10/2000 | Hatanaka et al. ........... 349/113 |
| 6,175,399 B1 | * | 1/2001 | Mitsui et al. ............... 349/113 |
| 6,266,112 B1 | * | 7/2001 | Mizobata et al. ........... 349/113 |
| 6,295,108 B1 | * | 9/2001 | Kaneko ....................... 349/115 |
| 6,433,845 B1 | * | 8/2002 | Suzuki et al. ............... 349/102 |

* cited by examiner

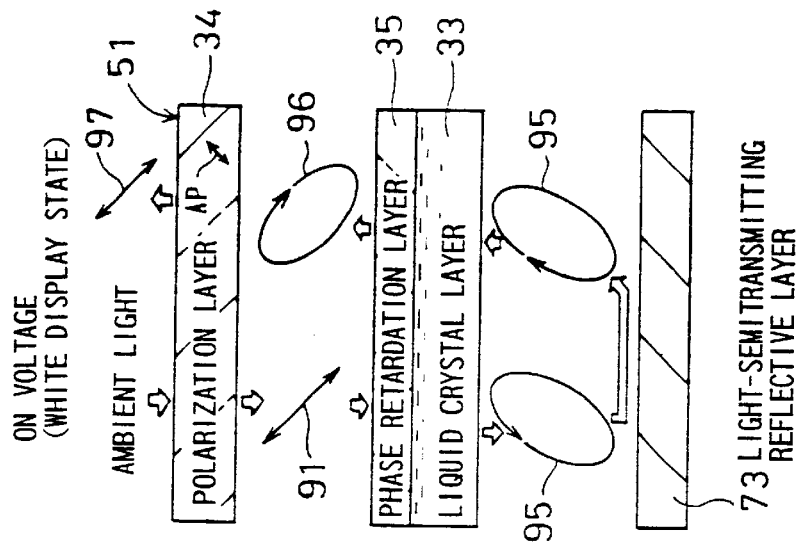
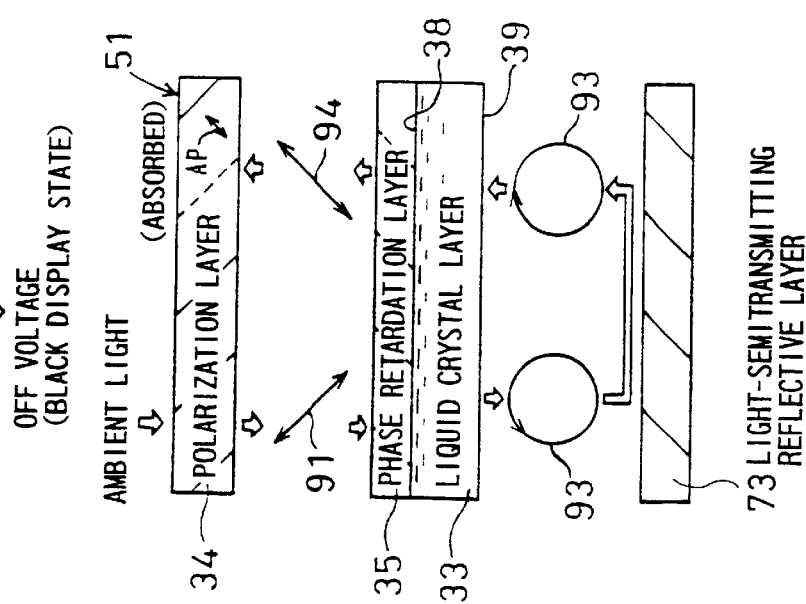

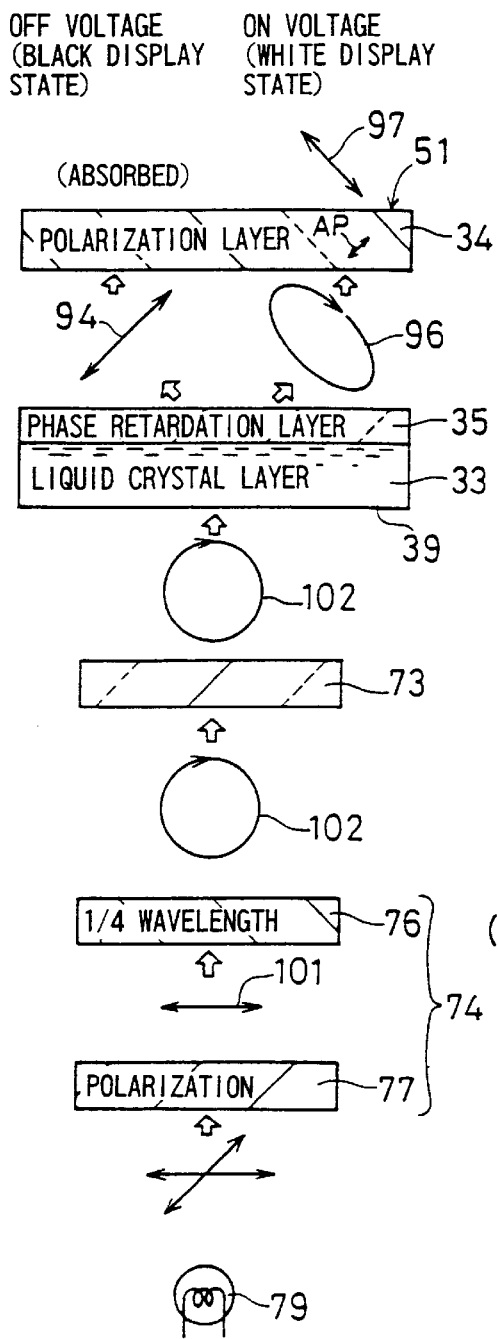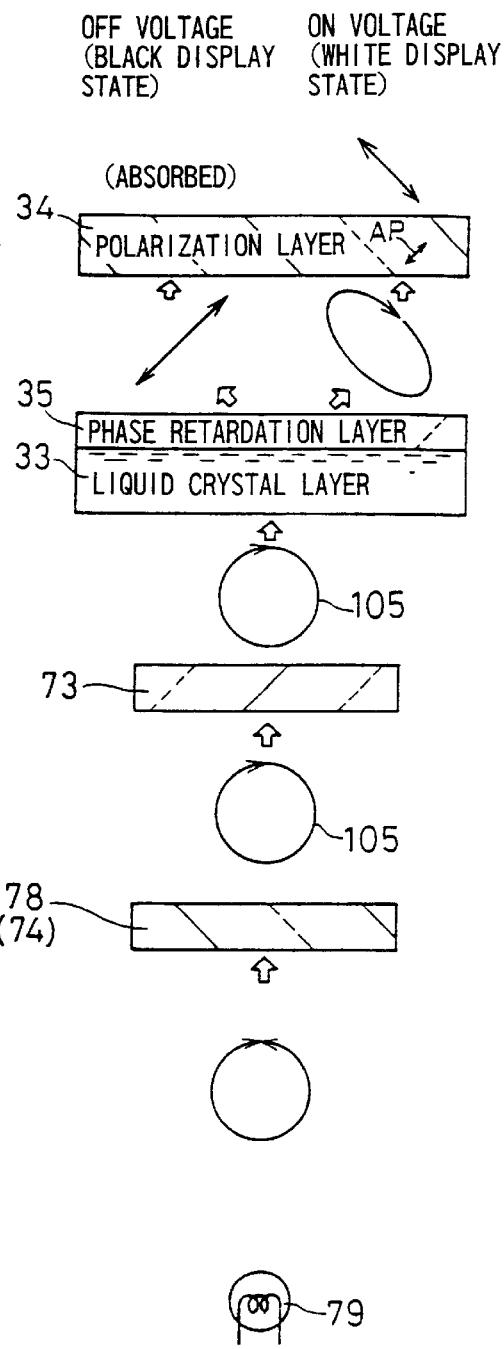

LIQUID CRYSTAL DISPLAY DEVICE

BACKGROUND OF THE INVENTION

1. Field of the Invention

The present invention relates to a liquid crystal display device that produces a display by utilizing light reflected from a reflective layer, and more particularly to a liquid crystal display device wherein both white and black display colors are achromatic colors, and wherein reflectivity in white display state is high and reflectively in black display state is low.

2. Description of the Related Art

Liquid crystal displays, which are thin and light compared with other types of display, are widely used in various applications including displays for portable information terminals. A liquid crystal display contains a liquid crystal cell as a light receiving type display element. The liquid crystal cell does not emit light by itself, but produces a display by changing its light-transmitting properties by being driven with an operating voltage of 1 to 9 volts. Accordingly, a reflective mode liquid crystal display, which displays images by reflecting ambient light using a reflector mounted underneath the liquid crystal, is an extremely low power consumption display device. It is also known that if a super twisted nematic (STN) liquid crystal cell is used in the liquid crystal display device, the price of the liquid crystal display device can be reduced because the construction of the liquid crystal display device can be simplified.

Conventionally, STN reflective liquid crystal displays utilize optical birefringence, whereas twisted nematic (TN) reflective liquid crystal displays utilize optical rotatory power. In STN reflective liquid crystal displays, therefore, optical compensation is difficult since the polarization state of the emergent light varies depending on the amount of birefringence in the liquid crystal layer. As shown in FIG. 9, a prior art STN reflective liquid crystal display device 1 comprises a liquid crystal cell 3 sandwiched between two polarizers 4 and 5 to enhance optical compensation. In the liquid crystal display device 1 as shown in FIG. 9, a phase retardation plate 6 is interposed between the liquid crystal cell 3 and the first polarizer 4. The second polarizer 5 is located between a reflector 7 and the liquid crystal cell 3. The liquid crystal cell 3 is constructed by sandwiching a liquid crystal layer 8 between two transparent substrates 9 and 10. Each substrate 9, 10 comprises an alignment film and electrodes formed on a substrate base.

When constructed as a color display using color filters, the reflective liquid crystal display device 1 which uses two polarizers involves the problem that optical reflectivity enough to provide sufficient brightness for display is difficult to obtain because of the light loss associated with the color filters. Furthermore, in the reflective liquid crystal display device 1, since the two polarizers 4 and 5 are mounted on the outside of the liquid crystal cell 3, the reflector 7 also has to be mounted on the outside of the liquid crystal cell 3. As a result, light loss is caused due to the presence of the substrate 10 of the liquid crystal cell 3 on the second polarizer 5 side.

In the reflective liquid crystal display device 1 using two polarizers, the substrate 10 about 1 mm thick and the second polarizer 5 about 0.2 mm thick are interposed between the reflector 7 and the liquid crystal layer 8. Consequently, when light is incident obliquely on the reflective liquid crystal display device 1 of FIG. 9, as shown in FIG. 10, the incident light when reflected passes through a pixel different from the pixel it passed through when it entered the cell. In this case, if the reflective liquid crystal display device 1 is viewed perspectively, it will be seen that parallax is caused such that the shade 16 of a displayed object appears to be projected on the reflector 7. Poor viewability caused by such parallax is also a problem with the reflective liquid crystal display device 1 of FIG. 9.

In view of the above situation, there is proposed, as shown in FIG. 11, a reflective liquid crystal display device 11 in which one polarizer is omitted to achieve an improvement in brightness corresponding to the omission of one polarizer. In FIG. 11, the same constituent elements as those in FIG. 9 are designated by the same reference numerals and an explanatory description thereof will not be given here. In the reflective liquid crystal display device of FIG. 11, only one polarizer 4 is arranged on the side of the liquid crystal cell 3 opposite from the reflector, and the second polarizer 5 is omitted. The applicant further proposes in Japanese Unexamined Patent Publication JP-A 7-84252 (1995) a reflective liquid crystal display device having only one polarizer and characterized by the provision of a reflector 7 within the liquid crystal cell 3. The reflective liquid crystal display device 11 having the structure as shown in FIG. 11 can thus eliminate the problem of light loss caused by the presence of the substrate 10 of the liquid crystal cell 3 on the second polarizer 5 side. Reflective liquid crystal display devices of the type in which the reflector 7 is disposed within the liquid crystal cell 3 are also disclosed in Japanese Unexamined Patent Publications JP-A 10-161110 (1998) and JP-A 10-170906 (1998). In the reflective liquid crystal display device of FIG. 11, the problem of poor viewability caused by parallax is also solved because of the absence of the substrate base and the second polarizer 5 between the liquid crystal layer 8 and the reflector 7.

FIG. 12A is a schematic diagram for explaining how the light loss occurs in the reflective liquid crystal display device 1 of FIG. 9 that has two polarizers. FIG. 12B is a schematic diagram for explaining how the light loss is reduced in the reflective liquid crystal display device 11 of FIG. 11 that has a single polarizer. The explanation of FIGS. 12A and 12B is given assuming that the transmittance of light per polarizer is 45% and that the transmittance of the polarization component parallel to the absorption axis of the polarizer is 0%. Further, in the explanation of FIGS. 12A and 12B, light absorption into color filters is not considered. In the examples of FIGS. 12A and 12B, of the polarization component orthogonal to the absorption axis of the polarizer, which accounts for 50% of the incident light, 10% is absorbed by the polarizer; this means that the transmittance of the polarization component orthogonal to the absorption axis, per polarizer, is 90%.

In the reflective liquid crystal display device 1 of FIG. 9 that uses two polarizers, since the incident light on the device 1 emerges from it after passing the polarizers a total of four times, the reflectivity is 32.8% as shown by expression (1). On the other hand, in the reflective liquid crystal display device 11 of FIG. 11 in which only one polarizer is used and the reflector is disposed within the liquid crystal cell 3, the incident light on the device 11 emerges from it after passing through the polarizer two times; therefore, the reflectivity is 40.5% as shown by expression (2). As can be seen from the above results, the reflective liquid crystal display device 11 having only one polarizer has the potential of providing up to about 23.5% improvement in reflectivity over the reflective liquid crystal display device 1 having two polarizers.

Reflectivity of liquid crystal display device of FIG. 9=0.9×0.9×
0.9×0.9×50%=32.8% (1)

Reflectivity of liquid crystal display device of FIG. 11=0.9×0.9×
50%=40.5% (2)

In the liquid crystal display device 11 having a single polarizer and a single reflector, however, the omission of one polarizer makes optical compensation all the more difficult, and the display background color which should be white or black is caused to shift. Specifically, in the case of an STN liquid crystal cell that utilizes optical birefringence, the color shift becomes pronounced, compared with the case of a TN liquid crystal cell that utilizes optical rotatory power. In the reflective liquid crystal display device 11 that uses an STN liquid crystal cell and has a single polarizer, color shifting is a major problem that must be overcome.

Japanese Unexamined Patent Publication JP-A 4-97121 (1992) discloses a technique for solving the color shift problem in a reflective liquid crystal display device having a single polarizer. The reflective liquid crystal display device disclosed in JP-A 4-97121 includes, in addition to the liquid crystal forming the liquid crystal cell, at least one optically anisotropic layer in order to eliminate the color shift occurring when the display device is operated in a reflective STN mode. The optically anisotropic layer is realized using a uniaxially oriented polymer film, and functions as a phase retardation layer. When increasing the viewing angle in the horizontal direction of the liquid crystal display device, the rubbing direction of the liquid crystal cell is determined so that the orientation direction of the uniaxially oriented film, that is, the retardation axis of the phase retardation layer, can be arranged parallel to the horizontal direction of the display screen. When increasing the contrast ratio of the liquid crystal display device, the rubbing direction is determined so that the retardation axis can be arranged parallel to the vertical direction of the display screen. In JP-A 4-97121, the combination of the angle that the absorption axis of the polarizer makes with the retardation axis of the phase retardation plate and the retardation values of the liquid crystal layer and the phase retardation layer, respectively, is (18°, 810 nm, 310 nm), (11°, 730 nm, 370 nm), or (75°, 690 nm, 360 nm).

The applicant also discloses in JP-A 7-84252 a technique for achromatizing the display color by eliminating the color shift occurring when displaying intermediate tones on a reflective liquid crystal display device having a single polarizer. To prevent the color shift caused by the birefringence properties of the liquid crystal, the reflective liquid crystal display device disclosed in JP-A 7-84252 includes, in addition to the liquid crystal forming the liquid crystal cell, an optical phase compensation member which is a phase retardation plate formed from at least one optically anisotropic layer. The retardation value of the liquid crystal, the retardation value of the optical phase compensation member, the direction of the polarization axis of the polarizer, the direction of the retardation axis of the optical phase compensation member, and the orientation direction of liquid crystal molecules are optimized to prevent the color shift from occurring when displaying intermediate tones. In JP-A 7-84252, the combination of the angle that the absorption axis of the polarizer makes with the retardation axis of the phase retardation plate and the retardation values of the liquid crystal layer and the phase retardation layer, respectively, is (85°, 650 nm, 350 nm) or (25°, 650 nm, 350 nm).

For the optimization of the reflective liquid crystal display device 11 of the type that uses a single polarizer and a phase retardation plate, the following optimization theory is generally known. When the difference between the retardation value dΔn of the liquid crystal layer and the retardation value of the phase retardation plate is approximately an integral multiple of one-quarter wavelength for all wavelengths of visible light, then the optical path difference when the light makes a round trip between the polarizer and the reflector is approximately an integral multiple of one-half wavelength for every wavelength of the visible light. Thus the light is ideally blocked by or transmitted through the polarizer. Accordingly, the reflective liquid crystal display device that uses the phase retardation plate and the polarizer respectively having the above defined retardation values can produce an ideal dark display state of low reflectivity or an ideal bright display state of high reflectivity.

The above optimization theory for reflective liquid crystal displays has previously be known for the case where the liquid crystal molecules in the liquid crystal cell are homogeneously aligned, as described in Japanese Unexamined Patent Publication JP-A 6-337414 (1994). In the liquid crystal display device disclosed in JP-A 6-337414, the liquid crystal molecules in the liquid crystal cell are aligned to provide a TN liquid crystal molecular alignment with a twist angle of 180° to 270°, that is, an STN alignment, in order to eliminate the viewing angle dependence of the reflective liquid crystal display device optimized based on the above optimization theory. In the liquid crystal display device disclosed in JP-A 6-337414, the combination of the angle that the absorption axis of the polarizer makes with the retardation axis of the phase retardation plate and the retardation values of the liquid crystal layer and the phase retardation layer, respectively, is (0°, 1090 nm, 320 nm) or (90°, 1090 nm, 320 nm); that is, the absorption axis and the retardation axis are parallel or orthogonal to each other.

The applicant also proposes in Japanese Unexamined Patent Publication JP-A 7-146469 (1995) a reflective liquid crystal display device having a single polarizer and a phase retardation plate based on the above optimization theory. In the liquid crystal display device disclosed in JP-A 7-146469, the polarizer is arranged on one side of the liquid crystal cell and the reflector on the opposite side of the liquid crystal cell, and a quarter wave plate as the phase retardation plate is interposed between the reflector and the opposite side of the liquid crystal cell. In this liquid crystal display device, the retardation value of the liquid crystal, the direction of the polarization axis of the polarizer, the direction of the retardation axis of the quarter wave plate, and the direction of the long axis of the liquid crystal molecules are optimized to eliminate color shifting and improve the contrast at the same time. This liquid crystal display device produces a white display when a voltage is applied across the liquid crystal layer so that the amount of birefringence in the liquid crystal layer becomes approximately equal to one-quarter wavelength, and a black display when a voltage is applied across the liquid crystal layer so that the amount of birefringence in the liquid crystal layer becomes approximately equal to zero.

Japanese Unexamined Patent Publication JP-A 10-123505 (1998) discloses a technique for preventing the color shift caused by the wavelength dependence of the amount of birefringence in the liquid crystal layer in a reflective liquid crystal display device designed based on the optimization theory. The liquid crystal display device disclosed in JP-A 10-123505 comprises a polarizer arranged on one side of the liquid crystal cell, a reflector placed between the liquid crystal layer and the substrate on the opposite side of the liquid crystal cell, and a compensation plate as a phase retardation plate, interposed between the polarizer and the one side of the liquid crystal cell, for the optical compensation of the liquid crystal layer. The compensation plate is constructed so that the wavelength dependence of the amount of birefringence in the compensation plate matches the wavelength dependence of the amount of birefringence in the liquid crystal layer, and the wavelength dependence of the amount of birefringence in the liquid crystal layer is canceled by the compensation layer. Such a compensation plate is realized using a uniaxially oriented film. In JP-A 10-123505, the angle that the absorption axis of the polarizer makes with the retardation axis of the compensation plate is 45° or 135°.

As described above, the reflective liquid crystal display device using a single polarizer utilizes a phase retardation plate formed from a single uniaxially oriented film to prevent color shifting. The compensation effect for color shift prevention that can be obtained by one uniaxially oriented film is smaller than the compensation effect required to eliminate the color shift in a liquid crystal display. Japanese Unexamined Patent Publications JP-A 10-170906 (1998), JP-A 10-232390 (1998), JP-A 9-292610 (1997), and JP-A 9-43596 (1997) disclose reflective liquid crystal display devices that use two or more phase retardation plates for the prevention of color shifting. These two or more phase retardation plates are each constructed from a single phase retardation layer, and differ from phase retardation plates of the type constructed by stacking a plurality of phase retardation layers one on top of another and combining these layers into a single plate. When using two or more phase retardation plates, the overall cost of the liquid crystal display device increases as the number of phase retardation plates used increases. Accordingly, liquid crystal display devices of the type that uses a single phase retardation plate can save manufacturing costs and are therefore advantageous in terms of cost compared with the type that uses two or more phase retardation plates.

For the reason described above, liquid crystal display devices of the type that uses a single phase retardation plate and a single polarizer are receiving attention nowadays, and intense research efforts are underway aiming at further optimization of liquid crystal display devices of the type that uses a single polarizer and a single phase retardation plate. However, in the case of liquid crystal display devices constructed using a single polarizer and a single phase retardation plate, particularly, liquid crystal display devices that uses an STN liquid crystal cell, optical compensation for the wavelength dependence of the amount of birefringence becomes difficult when the single phase retardation plate is formed from a single liquid crystal layer. For this reason, any of the liquid crystal display devices disclosed in the above-cited patent publications does not reach satisfactory levels for practical use in terms of the brightness of the white display, the contrast ratio, and the achromatization of white and black display colors.

SUMMARY OF THE INVENTION

An object of the invention is to provide a liquid crystal display device comprising a single polarization layer and a single phase retardation layer and utilizing reflected light, capable of achieving a bright white display and high contrast, while achieving achromatization of white and black display colors.

The invention provides a liquid crystal display device comprising:
  a single polarization layer for transmitting therethrough only a linearly polarized component of incident light, which is polarized in a predetermined direction;
  a reflective layer for reflecting light;
  a single phase retardation layer disposed between the polarization layer and the reflective layer; and
  a liquid crystal layer disposed between the polarization layer and the reflective layer,
  wherein retardation value ReF of the phase retardation layer is selected to be approximately equal to a (1/4+K/2)th multiple of wavelength $\lambda$ of the incident light (where K is an integer not smaller than 0);
  product $d1 \times \Delta n1$ of thickness $d1$ and optical anisotropy $\Delta n1$ of the liquid crystal layer is selected to be approximately equal to a (1/2+L/2)th multiple of the wavelength $\lambda$ of the incident light (where L is an integer not smaller than 0); and
  crossing angle $\Delta\phi$ between an absorption axis of the polarization layer and a retardation axis of the phase retardation layer is selected to be larger than 0° and smaller than 45°, or larger than 45° and smaller than 90°.

According to the invention, the liquid crystal display device includes a single polarization layer and a single phase retardation layer in addition to the liquid crystal layer and the reflective layer. The optical properties of the portion of the liquid crystal display device that comprises the liquid crystal layer and the phase retardation layer are adjusted so that linearly polarized light is changed to a state close to circular polarization when the wavelength of the incident light is 550 nm.

The thus constructed liquid crystal display device produces a display by utilizing the light reflected from the reflective layer, while correcting for the effects of optical birefringence. In this liquid crystal display device, the retardation value ReF of the phase retardation layer is set approximately equal to (1/4+K/2), the product $d1 \times \Delta n1$ of the thickness $d1$ and optical anisotropy $\Delta n1$ of the liquid crystal layer is set approximately equal to $(1/2+L/2)\lambda$, and the crossing angle $\Delta\phi$ between the absorption axis of the polarization layer and the retardation axis of the phase retardation layer is set as $0° < \Delta\phi < 90°$ (where $\Delta\phi \neq 45°$). With this arrangement, the polarization state of the incident light, when passing through the phase retardation layer, is changed to a state slightly displaced from circular polarization so that the light of optimum polarization state reaches the liquid crystal layer side surface of the reflective layer. The reason for $\Delta\phi \neq 45°$ is that if $\Delta\phi = 45°$, the polarization state of the light passed through the phase retardation layer is circular polarization, in which case the polarization state after passing through the liquid crystal layer will deviate from the optimum state (ideally, circular polarization) due to the effects of birefringence. Thus, compared with the prior art liquid crystal display devices having a single polarization layer and a single phase retardation layer, the liquid crystal display device of the invention achieves the characteristics that can increase the brightness of white display, improve the contrast, and render the white and black display states in achromatic colors.

As described above, according to the invention, the liquid crystal display device includes a single polarization layer and a single phase retardation layer in addition to the liquid crystal layer and the reflective layer, and the portion comprising the liquid crystal layer and the phase retardation layer has the optical properties such that linearly polarized light passing therethrough is converted to a state close to circular polarization. Thus the liquid crystal display device achieves the characteristics that increase the brightness of white display, improve the contrast, and render the white and black display states in achromatic colors. To achieve such characteristics, in the liquid crystal display device, the retardation value ReF of the phase retardation layer is set approximately equal to $(1/4+K/2)\lambda$, the product $d1 \times \Delta n1$ of the thickness d1 and optical anisotropy $\Delta n1$ of the liquid crystal layer is set approximately equal to $(1/2+L/2)\lambda$, and the crossing angle $\Delta\phi$ between the absorption axis of the polarization layer and the retardation axis of the phase retardation layer is set as $0° < \Delta\phi < 90°$ (where $\Delta\phi \neq 45°$). With this arrangement, the liquid crystal display device can reliably achieve the characteristics that increase the brightness of white display, improve the contrast, and render the white and black display states in achromatic colors.

In the liquid crystal display device of the invention it is preferable that the phase retardation layer is disposed between the liquid crystal layer and the polarization layer, and the incident light passed through the polarization layer and the phase retardation layer is in a state of elliptical polarization which is close to circular polarization.

According to the invention, the amount of displacement from circular polarization, applied in the portion comprising the polarization layer and the retardation layer in the liquid crystal display device, is relatively small, and the incident light passed through the polarization layer and then through the retardation layer emerges as elliptically polarized light, the polarization state slightly displaced from circular polarization. The light used for display can thus be set to a further optimized state just before it reaches the liquid crystal layer side of the reflective layer. Accordingly, the liquid crystal display device can further improve the contrast and enhance the achromatization.

In the liquid crystal display device of the invention, it is preferable that the crossing angle $\Delta\phi$ between the absorption axis of the polarization layer and the retardation axis of the phase retardation layer is selected to fall within a range of $40° \pm 3°$.

According to the invention, in the liquid crystal display device, the crossing angle $\Delta\phi$ between the absorption axis and the retardation axis is set at approximately 40°. With this arrangement, the polarization state of the light that strikes the reflective layer on the surface thereof closest to the liquid crystal layer can be further optimized, and thus the liquid crystal display device can provide an optimum high contrast ratio and achieve optimum achromatization. The reason for setting the tolerance of ±3° is that the optimum value somewhat varies depending on the retardation value of the liquid crystal layer, the retardation value of the phase retardation layer, and the crossing angle between the orientation axis of liquid crystal molecules on the bottom substrate and the absorption axis of the polarization layer.

In the liquid crystal display device of the invention, it is preferable that the liquid crystal layer is formed as a super twisted nematic layer, the twist angle of liquid crystal molecules in the liquid crystal layer is selected to be 180° or larger, and the product $d1 \times \Delta n1$ of the thickness d1 and optical anisotropy $\Delta n1$ of the liquid crystal layer, in the case where the wavelength $\lambda$ of the incident light is 550 nm, is selected to be larger than 760 nm and smaller than 860 nm.

According to the invention, the liquid crystal display device is constructed as an STN liquid crystal display device that produces a display by utilizing birefringence. The liquid crystal layer is designed so that the product $d1 \times \Delta n1$ of the thickness d1 and optical anisotropy $\Delta n1$ of the liquid crystal layer is larger than 760 nm but smaller than 860 nm for the incident light wavelength of 550 nm where the visual perception is the highest. The reason for this is as follows. If the product $d1 \times \Delta n1$ is 760 nm or smaller or 860 nm or larger when the incident light wavelength is 550 nm, the product $d1 \times \Delta n1$ deviates widely from an integral multiple of one-half wavelength. As a result, the same effect as provided by a half wave plate becomes difficult to obtain with the liquid crystal layer, and therefore, the contrast of the liquid crystal display device drops below the practical level. If the product $d1 \times \Delta n1$ is larger than 760 nm and smaller 860 nm when the incident light wavelength is 550 nm, the product $d1 \times \Delta n1$ becomes approximately equal to an integral multiple of one-half wavelength; as a result, the liquid crystal display device can provide sufficient contrast for practical use. The reason for setting tolerance for the retardation value of the liquid crystal layer is that the optimum value somewhat varies depending on the crossing angle $\Delta\phi$ between the absorption axis of the polarization layer and the retardation axis of the phase retardation layer, the retardation value of the phase retardation layer, and the crossing angle between the orientation axis of liquid crystal molecules on the bottom substrate and the absorption axis of the polarization layer.

In the liquid crystal display device of the invention, it is preferable that the liquid crystal layer is formed as a super twisted nematic layer, the twist angle of liquid crystal molecules in the liquid crystal layer is selected to be 180° or more, and the product $d1 \times \Delta n1$ of the thickness d1 and optical anisotropy $\Delta n1$ of the liquid crystal layer, when the wavelength $\lambda$ of the incident light is 550 nm, is selected to fall within a range of 770 nm to 856 nm.

According to the invention, the liquid crystal display device is constructed as an STN type liquid crystal display device. The liquid crystal layer is designed so that the product $d1 \times \Delta n1$ of the thickness d1 and optical anisotropy $\Delta n1$ of the liquid crystal layer is not smaller than 770 nm but not larger than 856 nm for the incident light wavelength of 550 nm. With this arrangement, the liquid crystal display device can achieve a contrast of 2 or higher, providing optimum display quality for practical use. If the product is smaller than 770 nm or larger than 856 nm, the contrast will further decrease.

In the liquid crystal display device of the invention, it is preferable that the liquid crystal layer is formed as a super twisted nematic layer, the twist angle of liquid crystal molecules in the liquid crystal layer is selected to be 180° or larger, and the retardation value ReF of the phase retardation layer, when the wavelength $\lambda$ of the incident light is 550 nm, is selected to be larger than 360 nm and smaller than 450 nm.

According to the invention, the liquid crystal display device is constructed as an STN liquid crystal display device that produces a display by utilizing birefringence. The phase retardation layer is formed so that the retardation value ReF of the phase retardation layer is larger than 360 nm but smaller than 450 nm for the incident light wavelength of 550 nm where the visual perception is the highest. The reason for this is as follows. If the retardation value of the phase retardation layer is 360 nm or smaller or 450 nm or larger when the incident light wavelength is 550 nm at which the visual perception is the highest, the retardation value of the phase retardation layer deviates widely from a $(2L+1)$th multiple of one-quarter wavelength; as a result, the contrast of the liquid crystal display device drops below the practical level. If the retardation value of the phase retardation layer is larger than 360 nm and smaller 450 nm when the incident light wavelength is 550 nm, the retardation value of the phase retardation layer becomes approximately equal to a $(2L+1)$th multiple of one-quarter wavelength; as a result, the liquid crystal display device can provide sufficient contrast for practical use. The reason for setting tolerance for the retardation value of the phase retardation layer is that the optimum value somewhat varies depending on the crossing angle Δϕ between the absorption axis of the polarization layer and the retardation axis of the phase retardation layer, the retardation value of the liquid crystal layer, and the crossing angle between the orientation axis of liquid crystal molecules on the bottom substrate and the absorption axis of the polarization layer.

In the liquid crystal display device of the invention, it is preferable that the liquid crystal layer is formed as a super twisted nematic layer, the twist angle of liquid crystal molecules in the liquid crystal layer is selected to be 180° or larger, and the retardation value ReF of the phase retardation layer, when the wavelength λ of the incident light is 550 nm, is selected to fall within a range of 365 nm to 445 nm.

According to the invention, the liquid crystal display device is constructed as an STN liquid crystal display device. The phase retardation layer is designed so that the retardation value ReF of the phase retardation layer falls within a range of 365 nm to 445 nm for the incident light wavelength of 550 nm where the visual perception is the highest. With this arrangement, the liquid crystal display device can achieve a contrast of 2 or higher, providing optimum display quality for practical use. If the retardation value is smaller than 365 nm or larger than 445 nm, the contrast will further decrease.

In the liquid crystal display device of the invention, it is preferable that the liquid crystal layer is formed as a super twisted nematic layer, the twist angle of liquid crystal molecules in the liquid crystal layer is selected to be 180° or larger, and crossing angle θ between the orientation direction of liquid crystal molecules lying closest to the reflective layer and the absorption axis of the polarization layer is selected to fall within a range of −10° to +10°.

According to the invention, the liquid crystal display device is constructed as an STN liquid crystal display device that produces a display by utilizing birefringence. The polarization layer and the liquid crystal layer are designed so that the crossing angle θ between the absorption axis of the polarization layer and the orientation direction of the liquid crystal molecules lying closest to the reflective layer is not less than −10° but not larger than +10°. The reason for this is as follows. If the crossing angle θ between the absorption axis and the orientation direction is outside the range of −10° to +10°, color shifting when ON voltage is applied to the liquid crystal layer or when OFF voltage is applied becomes pronounced and the display quality falls short of the practical level. If the crossing angle θ between the absorption axis and the orientation direction is set within the range of −10° to +10°, the color shift occurring at the time of the ON voltage application, as well as at the time of the OFF voltage application, can be reduced to a level low enough for practical use. The reason for setting the tolerance range of ±10° is that the optimum value somewhat varies depending on the crossing angle Δϕ between the absorption axis of the polarization layer and the retardation axis of the phase retardation layer, the retardation value of the liquid crystal layer, and the retardation value of the phase retardation layer.

In the liquid crystal display device of the invention it is preferable that the phase retardation layer is a uniaxially oriented film.

According to the invention, a uniaxially oriented film is used as the phase retardation layer. This serves to reduce the cost of the phase retardation layer.

In the liquid crystal display device of the invention, it is preferable that the liquid crystal display device further comprises two substrates sandwiching the liquid crystal layer therebetween, and the reflective layer is disposed between the liquid crystal layer and either one of the two substrates.

According to the invention, the liquid crystal display device includes two substrates and the reflective layer is disposed between the liquid crystal layer and either one of the two substrates. With this arrangement, the liquid crystal display device can alleviate the overall reflectivity degradation of the liquid crystal display device caused by the presence of the substrate and reduce the parallax associated with the thickness of the substrate.

In the liquid crystal display device of the invention, it is preferable that the liquid crystal display device further comprises a scattering layer for scattering light, which is disposed on the side of the liquid crystal layer closest to the polarization layer, and the side of the reflective layer closest to the liquid crystal layer is planarized.

According to the invention, since the reflective layer in the liquid crystal display device is planarized, the reflective layer can also be used as an electrode. Furthermore, since the positive reflection component of the light reflected by the specular surface can be suitably scattered by the scattering layer in the viewing direction, the apparent lightness of the liquid crystal display device increases.

In the liquid crystal display device of the invention it is preferable that the phase retardation layer is disposed between the polarization layer and the liquid crystal layer, and the scattering layer is disposed between the phase retardation layer and the liquid crystal layer.

According to the invention, the polarization layer, the phase retardation layer, the scattering layer, and the liquid crystal layer are stacked in this order from the top to the bottom of the liquid crystal display device. In the liquid crystal display device thus constructed, since backscattering from the scattering layer is reduced, the display blurring of the liquid crystal display device caused by scattering can be alleviated.

In the liquid crystal display device of the invention, it is preferable that the reflective layer is a light-semitransmitting layer which reflects only a portion of incoming light and allows the remaining portion thereof to pass through.

According to the invention, the liquid crystal display device is constructed as a light-semitransmitting type liquid crystal display device which combines the characteristics of a reflective liquid crystal display device with the characteristics of a light-transmitting type liquid crystal display device. Accordingly, when there is no light entering the liquid crystal layer from the one side thereof, the liquid crystal display device can produce a display by utilizing light entering the liquid crystal layer from behind the reflector. For example, when a backlight source is mounted on the side of the reflective layer opposite from the liquid crystal layer, the liquid crystal display device can be used if no ambient light is available.

In the liquid crystal display device of the invention, it is preferable that the liquid crystal display device further comprises a circular polarization selecting layer for selectively transmitting only a circular polarization component of the incident light, which circular polarization selecting layer is disposed on the side of the liquid crystal layer closest to the reflective layer.

According to the invention, when the liquid crystal display device is of a light-semitransmitting type, the light entering the liquid crystal layer from the opposite side thereof is already confined to circular polarization by the circular polarization selecting layer. When producing a display utilizing light passed through the reflective layer, the light passing through the reflective layer must be optimized so that the incident light emerges as circularly polarized light from the side of the reflective layer closest to the liquid crystal layer, similarly to the case where the light reflected by the reflective layer is used for display. With this arrangement, not only when producing a display utilizing the light reflected by the reflective layer, but also when producing a display utilizing the light passed through the reflective layer, the liquid crystal display device can achieve the characteristics that increase the brightness of white display, improve the contrast, and render the white and black display states in achromatic colors.

In the liquid crystal display device of the invention, it is preferable that the circular polarization selecting layer comprises a quarter wave layer and a polarization layer for transmitting therethrough only a linearly polarized component of incident light and polarized in a predetermined direction, and the quarter wave layer is disposed between the polarization layer and the liquid crystal layer.

According to the invention, when the liquid crystal display device is of a light-semitransmitting type, the circular polarization selecting layer can reliably confine the incident light to circular polarization before the light is passed through the reflective layer and enters the liquid crystal layer from the opposite side thereof. As a result, the light that enters the liquid crystal layer by passing through the reflective layer can be reliably confined to a polarization state close to circular polarization.

In the liquid crystal display device of the invention, it is preferable that the circular polarization selecting layer is a circular polarization selective reflecting layer which reflects either a right-hand circularly polarized component or a left-hand circularly polarized component of the incident light and allows the other component to pass therethrough.

According to the invention, the circular polarization selecting layer decomposes the incident light into the right-hand circularly polarized component and the left-hand circularly polarized component, and reflects either one of the components, while allowing the other component to pass therethrough; accordingly, when the liquid crystal display device is of a light-semitransmitting type, the light that enters the liquid crystal layer by passing through the reflective layer can be reliably confined to circular polarization.

BRIEF DESCRIPTION OF THE DRAWINGS

Other and further objects, features, and advantages of the invention will be more explicit from the following detailed description taken with reference to the drawings wherein:

FIGS. 7A and 7B are schematic diagrams illustrating the principle for driving a pixel for display in the reflective display mode of the liquid crystal display devices of FIGS. 6A and 6B;

FIGS. 8A and 8B are schematic diagrams illustrating the principle for driving a pixel for display in the light-transmitting display mode of the liquid crystal display devices of FIGS. 6A and 6B;

DETAILED DESCRIPTION OF THE PREFERRED EMBODIMENTS

Figure 1:
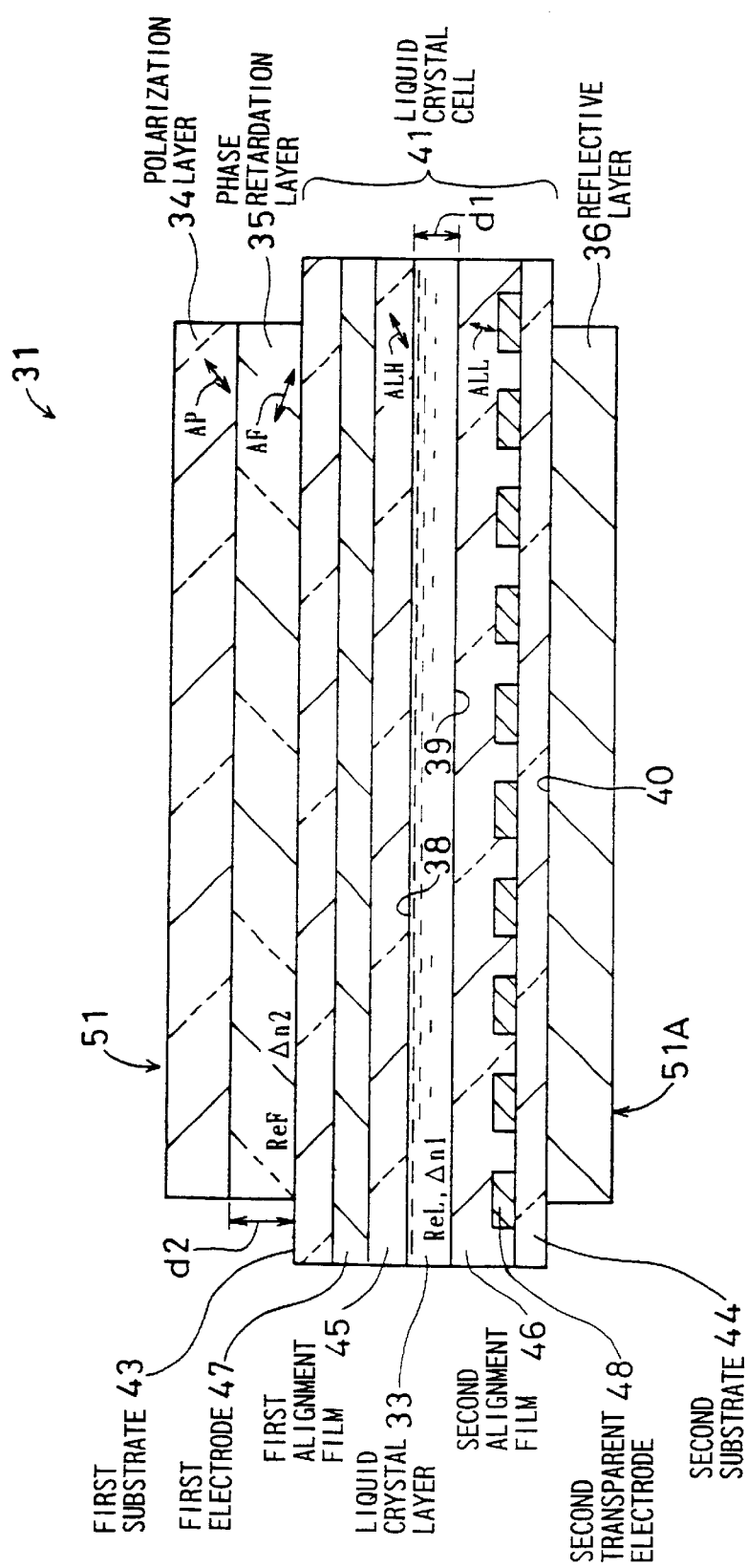
FIG. 1 is a diagrammatic cross sectional view showing the structure of a reflective liquid crystal display device 31 according to a first embodiment of the invention.

Now referring to the drawings, preferred embodiments of the invention are described below.

FIG. 1 is a cross sectional view schematically showing the structure of a liquid crystal display device 31 according to a first embodiment of the invention. The liquid crystal display device 31 includes at least a liquid crystal layer 33, a single polarization layer 34, a single phase retardation layer 35, and a reflective layer 36. The polarization layer 34 is disposed on one side 38 of the liquid crystal layer 33. The reflective layer 36 is disposed on the opposite side 39 of the liquid crystal layer 33. The phase retardation layer 35 is disposed between the polarization layer 34 and the reflective layer 36. Preferably, the liquid crystal layer 33 is formed from a liquid crystal that can provide a birefringence effect. The outermost surface of the liquid crystal display device 31 on the side where the polarization layer 34 is disposed serves as the display surface 51 of the liquid crystal display device 31. The outermost surface of the liquid crystal display device 31 on the side where the reflective layer 36 is disposed is a rear surface 51A.

Of all the components of the incident light, only the linearly polarized component polarized in a designated direction is allowed to pass through the polarization layer 34. The reflective layer 36 reflects the light passed through the polarization layer 34, the phase retardation layer 35, and the liquid crystal layer 33. The reflected light passes through the liquid crystal layer 33 and then through the phase retardation layer 35 and, depending on the polarization state after passing through the phase retardation layer, the light is passed through or absorbed by the polarization layer 34. The polarization state of the reflected light emerging from the phase retardation layer is determined for each pixel by the voltage applied across the liquid crystal layer 33. In this way, the liquid crystal display device 31 produces a display by utilizing the light reflected from the reflective layer 36.

The optical properties of the portion of the liquid crystal display device 31 from the liquid crystal layer 33 through the phase retardation layer 35 are such that the linearly polarized light entering from above the phase retardation layer 35 is converted to circularly polarized light before it emerges from that portion. To achieve this, at least one of three parameters, i.e., the retardation value ReL of the liquid crystal layer 33, the retardation value ReF of the phase retardation layer 35, and the crossing angle Δϕ between the absorption axis AP of the polarization layer 34 and the retardation axis AF of the phase retardation layer 35, is adjusted.

The retardation value ReL of the liquid crystal layer 33 is selected approximately equal to a value CReL. CReL is the reference value for the retardation value of the liquid crystal layer 33, and is determined by expression (3) based on the wavelength λ of the light entering the liquid crystal display device 31 and an integer L not smaller than 0. The retardation value ReL of the liquid crystal layer is, as shown by expression (4), equal to the product of the thickness d1 and optical anisotropy Δn1 of the liquid crystal layer. The retardation value ReF of the phase retardation layer 35 is selected approximately equal to a value CReF. CReF is the reference value for the retardation value of the phase retardation layer 35, and is determined by expression (5) based on the wavelength λ of the light entering the liquid crystal display device 31 and an integer K not smaller than 0. The retardation value ReF of the phase retardation layer 35 is, as shown by expression (6), equal to the product of the thickness d2 and optical anisotropy Δn2 of the phase retardation layer. The integer K in expression (5) may be set equal to or different from the integer L in expression (3).

$$CReL = \left(\frac{1}{2} + \frac{L}{2}\right) \times \lambda (L = 0, 1, 2, ...) \quad (3)$$

$$ReL = d1 \times \Delta n1 \quad (4)$$

$$CReF = \left(\frac{1}{4} + \frac{K}{2}\right) \times \lambda (K = 0, 1, 2, ...) \quad (5)$$

$$ReF = d2 \times \Delta n2 \quad (6)$$

Figure 2:
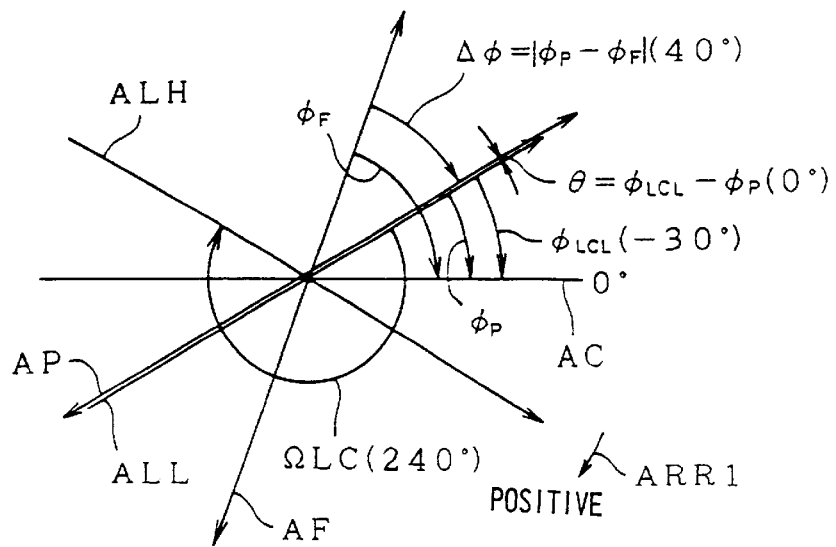
FIG. 2 is a diagram showing the arrangement conditions for various constituent elements of the liquid crystal display device 31 of FIG. 1.

FIG. 2 is a diagram showing the arrangement conditions for the liquid crystal layer 33, the polarization layer 34, and the phase retardation layer 35 constituting the liquid crystal display device 31. FIG. 2 shows the liquid crystal display device 31 as viewed from the viewer side, that is, from above the display surface 51. In this specification, when measuring the angle between two axes, the twist direction of the liquid crystal molecules aligned along the direction pointing from the reflective layer 36 to the polarization layer 34 is taken as positive. Reference axis AC is predefined in the liquid crystal display device 31. In FIG. 2, the twist direction of the liquid crystal molecules is shown by arrow ARR1. Arrow ALH indicates the long axis direction of the liquid crystal molecules lying closest to the one side 38 of the liquid crystal layer. Arrow ALL indicates the long axis direction of the liquid crystal molecules lying closest to the other side 39 of the liquid crystal layer. Arrow ΩLC indicates the twist angle of the liquid crystal forming the liquid crystal layer 33. In the example of FIG. 1, the angle ϕLCL that the long axis direction ALL of the liquid crystal molecules lying closest to the opposite side 39 of the liquid crystal layer makes with the reference axis AC is −30°.

As shown by expression (7) below, the crossing angle Δϕ between the absorption axis AP of the polarization layer 34 and the retardation axis AF of the phase retardation layer 35 is defined by the difference between the angle ϕP that the absorption axis AP makes with the reference axis AC and the angle ϕF that the retardation axis AF makes with the reference axis AC. The crossing angle between the absorption axis AP of the polarization layer and the retardation axis AF of the phase retardation layer is referred to as the "retardation/absorption crossing angle". The retardation/absorption crossing angle Δϕ is selected to lie within the predefined angular range shown by expression (8), that is, to be larger than 0° and smaller than 45°, or larger than 45° and smaller than 90°.

$$\Delta\phi = |\phi P - \phi F| \quad (7)$$

$$0° < \Delta\phi < 45° \text{ or } 45° < \Delta\phi < 90° \quad (8)$$

The angle θ that the absorption axis AP of the polarization layer 34 makes with the long axis direction ALL of the liquid crystal molecules lying closest to the other side 39 of the liquid crystal layer is, as shown by expression (9), equal to the difference between the angle ϕP that the absorption axis AP makes with the reference axis AC and the angle ϕLCL that the long axis direction ALL makes with the reference axis AC. The angle that the absorption axis AP of the polarization layer makes with the long axis direction ALL of the liquid crystal molecules lying closest to the other side of the liquid crystal layer is referred to as "long axis/absorption crossing angle". Preferably, the long axis/absorption crossing angle θ is selected to be a value within ±10 degrees, as shown by expression (10).

$$\theta = \phi LCL - \phi P \quad (9)$$

$$-10° \leq \theta \leq +10° \quad (10)$$

Referring back to FIG. 1, the liquid crystal display device contemplated by the invention, which produces a display by utilizing reflected light, includes a light-semitransmitting type liquid crystal display device as well as a reflective liquid crystal display device, and the reflective liquid crystal display device contemplated includes a front light type liquid crystal display device. In the example of FIG. 1, the liquid crystal display device 31 is constructed as a direct matrix reflective liquid crystal display device for producing a monochrome display.

In the example of FIG. 1, the liquid crystal display device 31 contains a liquid crystal cell 41, and the liquid crystal layer 33 is confined within the liquid crystal cell 41. The polarization layer 34 and the reflective layer 36 are disposed outside the liquid crystal cell 41, while the phase retardation layer 35 is interposed between the polarization layer 34 and the liquid crystal cell 41.

The liquid crystal cell 41 includes, in addition to the liquid crystal layer 33, a first substrate 43, a second substrate 44, a first alignment film 45, a second alignment film 46, a first electrode array 47, and a second electrode array 48. The first substrate 43 and the second substrate 44 are disposed opposite each other across the liquid crystal layer 33. The first alignment film 45 is disposed in a position closest to the one side 38 of the liquid crystal layer 33. The second alignment film 46 is disposed in a position closest to the opposite side 39 of the liquid crystal layer 33. The first electrode array 47 is disposed between the first substrate 43 and the first alignment film 45. The second electrode array 48 is disposed between the second substrate 44 and the second alignment film 46. The long axis directions ALH and ALL of the liquid crystal molecules lying closest to the one side 38 and the opposite side 39 of the liquid crystal layer, respectively, are controlled by the first and second alignment films 45 and 46 disposed closest to the one side 38 and the opposite side 39, respectively.

Pixels are formed in the portions of the liquid crystal cell 41 where the liquid crystal layer 33 is sandwiched between the first electrode array 47 and the second electrode array 48 via the respective alignment films 45 and 46, as viewed from the display surface 51 side. Using the first and second electrodes 47 and 48 associated with a particular pixel, a voltage of a magnitude predetermined according to the display state of the pixel is applied across the portion of the liquid crystal layer 33 corresponding to that pixel. In the description hereinafter given, the voltage applied to drive the pixel in black display mode is referred to as the "OFF voltage", and the voltage applied to drive the pixel in white display mode is referred to as the "ON voltage". At least, the first substrate 43, the first electrode array 47, the first alignment film 45, and the second alignment film 46 transmits light. In the example of FIG. 1, the second substrate 44 and the second electrode array 48 also transmit light. The transparent second electrode array is referred to as the "second transparent electrode array".

The constituent elements of the direct matrix monochrome reflective liquid crystal display device 31 of FIG. 1 will be described in detail below. The first substrate 43 and the second substrate 44 are each formed from a glass substrate. The phase retardation layer 35 is realized using a uniaxially oriented phase retardation plate formed from polycarbonate. The reflective layer 36 is realized using a silver reflector plate formed by evaporating silver over mat pet. The first electrode array 47 and the second electrode array 48 each consist of a plurality of stripe electrodes formed from thin film strips of ITO (indium tin oxide). The line width of each first electrode 47 is 60 $\mu$m, and the spacing between any two adjacent first electrodes 47 is 15 $\mu$m. The line width of each second electrode 48 is 90 $\mu$m, and the spacing between any two adjacent second electrodes 48 is 15 $\mu$m. As viewed from the display surface 51 side, the longitudinal directions of the first and second electrodes 47 and 48 are oriented at right angles to each other so that the intersections between the first and second electrodes 47 and 48 are arranged in a matrix pattern with each intersection coinciding with the position of the molecular twist. The thickness d of the liquid crystal layer 33 is 6 $\mu$m. The liquid crystal layer 33 is formed from a nematic mixture liquid crystal material with a laevorotatory chiral agent added to it. The first and second alignment films 45 and 46 are each realized using a polyimide based alignment film formed by rubbing a polyimide based thin film. The orientation directions of the first and second alignment films 45 and 46 are determined so that the liquid crystal provides a twist angle of 240°. The liquid crystal layer 33 thus functions in the STN mode. The specific construction of each element of the liquid crystal display device of the invention is not limited to the particular example described above.

In the prior art liquid crystal displays comprising a single polarization layer, a single phase retardation layer, and a reflective layer, the brightness of the white display, the contrast ratio, and the achromatization of white and black display colors fall short of satisfactory levels for practical use. To overcome these problems of the prior art based on theory, the inventor conducted first to fourth experiments to be described later, and obtained the optimization conditions for the optimization of the liquid crystal display device 31 by studying the results of the experiments.

In each experiment, a plurality of liquid crystal display devices were fabricated as samples by varying only the parameter to be evaluated and, for each sample, the contrast Co, the color tone in the black display state, the color tone in the white display state, the retardation value ReF of the phase retardation layer 35, and the retardation value ReL of the liquid crystal layer 33 were measured as the parameters representing the display state of the liquid crystal display device. Of the constituent elements of each sample liquid crystal display device, those elements which have no relevance to the evaluation parameters are identical in construction to the corresponding elements described with reference to FIG. 1.

For the measurement of the contrast Co, diffused light was used as the incident light, and the reflected light emerging from a 10-mm diameter region within the display surface 51 of the device 31 at an angle of 2° relative to a direct line of sight was measured in two different conditions, one during the ON voltage application and the other during the OFF voltage application. The ratio, LON/LOFF, of the reflectivity LON at the time of the ON voltage application to the reflectivity LOFF at the time of the OFF voltage application was obtained, and the ratio of the amount of the reflected light at the time of the ON voltage application to the amount of the reflected light at the time of the OFF voltage application when the ratio LON/LOFF was the greatest was taken as the contrast Co of that sample. The pixel appears white when the ON voltage is applied, and black when the OFF voltage is applied. The reflectivity is the ratio of the amount of the reflected light emerging from the liquid crystal display device to the amount of the light incident on the liquid crystal display device.

For the measurement of the color tone, diffused light was used as the incident light, and the reflected light emerging from the 10-mm diameter region at an angle of 2° relative to a direct line of sight was measured; the measured reflected light was evaluated in a CIE chromaticity space. The retardation value ReL of the liquid crystal layer was measured using a rotating analyzer method with no voltage applied to the liquid crystal layer. The retardation value of the phase retardation layer was also measured using a rotating analyzer method. Hereafter, unless specifically stated otherwise, the measured retardation value ReL of the liquid crystal layer is the value measured when the wavelength $\lambda$ of the incident light is 589 nm, and the measured retardation value ReF of the phase retardation layer is the value measured when the wavelength $\lambda$ of the incident light is 550 nm. Of all the wavelengths of visible light, 550 nm is the wavelength at which the visual perception is the highest. The wavelength of 589 nm is the wavelength customarily used when measuring the retardation value ReL of the liquid crystal layer. Both the retardation value ReL of the liquid crystal layer and the retardation value ReF of the phase retardation layer have dependence on chromatic dispersion.

Table 1 shows detailed design parameters for the respective samples. Table 2 shows the results of the measurements of the display states of the respective samples in the first to fourth experiments.

TABLE 1

|  |  |  | Crossing angle*1 Δφ (°) | Retardation ReL*2 (λ = 589 nm) | Retardation ReF*3 (λ = 550 nm) | Crossing angle*4 θ (°) | φP | φF | φLCL | ΩLC |
|---|---|---|---|---|---|---|---|---|---|---|
| Investigation of the crossing angle of the absorption axis of polarizer relative to the retardation axis of phase retardation plate (Experiment 1) | samples | 1 | 45.0 | 808 | 395 | 0.0 | −25 | −70 | −30 | 240 |
|  |  | 2 | 45.0 | 808 | 395 | 0.0 | −25 | −70 | −30 | 240 |
|  |  | 3 | 42.5 | 808 | 395 | 0.0 | −27.5 | −70 | −30 | 240 |
|  |  | 4 | 40.0 | 808 | 395 | 0.0 | −30 | −70 | −30 | 240 |
|  |  | 5 | 37.5 | 808 | 395 | 0.0 | −32.5 | −70 | −30 | 240 |
|  |  | 6 | 35.0 | 808 | 395 | 0.0 | −35 | −70 | −30 | 240 |
| Retardation value of liquid crystal layer (Experiment 2) | samples | 7 | 40.0 | 755 | 395 | 0.0 | −30 | −70 | −30 | 240 |
|  |  | 8 | 40.0 | 782 | 395 | 0.0 | −30 | −70 | −30 | 240 |
|  |  | 9 | 40.0 | 808 | 395 | 0.0 | −30 | −70 | −30 | 240 |
|  |  | 10 | 40.0 | 836 | 395 | 0.0 | −30 | −70 | −30 | 240 |
| Retardation value of phase retardation plate (Experiment 3) | samples | 11 | 40.0 | 888 | 365 | 0.0 | −30 | −70 | −30 | 240 |
|  |  | 12 | 40.0 | 808 | 385 | 0.0 | −30 | −70 | −30 | 240 |
|  |  | 13 | 40.0 | 808 | 390 | 0.0 | −30 | −70 | −30 | 240 |
|  |  | 14 | 40.0 | 808 | 395 | 0.0 | −30 | −70 | −30 | 240 |
|  |  | 15 | 40.0 | 808 | 415 | 0.0 | −30 | −70 | −30 | 240 |
|  |  | 16 | 40.0 | 808 | 445 | 0.0 | −30 | −70 | −30 | 240 |
| Investigation of the crossing angle of the orientation axis of liquid crystal molecules on bottom substrate relative to the absorption axis of polarizer (Experiment 4) | samples | 17 | 40.0 | 808 | 445 | +10.0 | −40 | −80 | −30 | 240 |
|  |  | 18 | 40.0 | 808 | 445 | +5.0 | −35 | −75 | −30 | 240 |
|  |  | 19 | 40.0 | 808 | 445 | 0.0 | −30 | −70 | −30 | 240 |
|  |  | 20 | 40.0 | 808 | 445 | −5.0 | −25 | −65 | −30 | 240 |
|  |  | 21 | 40.0 | 808 | 445 | −10.0 | −20 | −60 | −30 | 240 |

*1Crossing angle Δφ (°) of the absorption axis of polarizer relative to the retardation axis of phase retardation plate
*2Retardation ReL of liquid crystal layer (λ = 589 nm)
*3Retardation ReF of phase retardation plate (λ = 550 nm)
*4Crossing angle θ (°) of the orientation axis of liquid crystal molecules on bottom substrate relative to the absorption axis of polarizer

TABLE 2

|  |  |  | Contrast (Co) | Color tone | | | | | |
|---|---|---|---|---|---|---|---|---|---|
|  |  |  |  | ON voltage (white) | | | OFF voltage (black) | | |
|  |  |  |  | L* | a* | b* | L* | a* | b* |
| Investigation of the crossing angle of the absorption axis of polarizer relative to the retardation axis of phase retardation plate (Experiment 1) | samples | 1 | 4.0 | 51.98 | −2.27 | 3.43 | 26.66 | 22.24 | −16.40 |
|  |  | 2 | 1.9 | 48.64 | 8.19 | 2.41 | 34.84 | 41.39 | −25.38 |
|  |  | 3 | 4.3 | 51.51 | −2.45 | 2.57 | 25.43 | 20.18 | −15.91 |
|  |  | 4 | 5.1 | 51.71 | −3.54 | 1.66 | 23.29 | 12.90 | −13.80 |
|  |  | 5 | 3.4 | 49.66 | −3.11 | −2.88 | 27.50 | −1.20 | −7.34 |
|  |  | 6 | 3.1 | 49.04 | −3.25 | −3.44 | 28.67 | −4.42 | −5.98 |
| Retardation value of liquid crystal layer (Experiment 2) | samples | 7 | 3.9 | 51.96 | −1.55 | 1.20 | 27.37 | 8.45 | 0.86 |
|  |  | 8 | 5.8 | 51.73 | −2.28 | 2.35 | 21.72 | 16.20 | −5.35 |
|  |  | 9 | 5.1 | 51.71 | −3.54 | 1.66 | 23.29 | 12.90 | −13.80 |
|  |  | 10 | 2.1 | 51.52 | −1.64 | −1.11 | 36.80 | 6.05 | −4.59 |
| Retardation value of phase retardation plate (Experiment 3) | samples | 11 | 2.8 | 51.58 | 0.21 | 1.52 | 31.98 | 17.85 | −9.16 |
|  |  | 12 | 3.4 | 51.36 | −0.09 | 2.68 | 28.55 | 18.57 | 3.22 |
|  |  | 13 | 4.1 | 51.63 | −1.98 | 0.59 | 25.97 | 11.52 | −3.99 |
|  |  | 14 | 5.1 | 51.71 | −3.54 | 1.66 | 23.29 | 12.90 | −13.80 |
|  |  | 15 | 3.1 | 51.76 | −5.90 | 6.07 | 30.57 | −0.11 | −1.84 |
|  |  | 16 | 2.5 | 51.69 | −9.11 | 5.52 | 33.93 | −7.19 | 1.76 |
| Investigation of the crossing angle of the orientation axis of liquid crystal molecules on bottom substrate relative to the absorption axis of polarizer (Experiment 4) | samples | 17 | 3.4 | 50.75 | −0.10 | 2.62 | 28.20 | 25.80 | −6.40 |
|  |  | 18 | 4 | 50.32 | −0.88 | 1.66 | 25.79 | 24.54 | −11.52 |
|  |  | 19 | 5.1 | 51.71 | −3.54 | 4.75 | 23.29 | 12.90 | −13.80 |
|  |  | 20 | 5.3 | 50.12 | −4.11 | 8.43 | 22.03 | 24.64 | −19.11 |
|  |  | 21 | 5.9 | 50.20 | −6.46 | 12.02 | 20.73 | 25.79 | −27.27 |

The first experiment will be described below. In the first experiment, six liquid crystal display devices as the first to sixth samples are used. The first to sixth samples are constructed so that the retardation/absorption crossing angle $\Delta\phi$ differs among the samples; the retardation values ReL and ReF of the liquid crystal layer and phase retardation layer and the long axis/absorption crossing angle $\theta$ are the same for all samples. The detailed design parameters for the first to sixth samples are shown in Table 1. The retardation/absorption crossing angle $\Delta\phi$ is 45° for both the first and second samples. For the third to sixth samples, the retardation/absorption crossing angle $\Delta\phi$ is gradually reduced from 45°. In this case, the angle $\phi P$ of the absorption axis AP of the polarization layer 34 is varied from sample to sample while holding the angle $\phi F$ of the retardation axis AF of the phase retardation layer 35 the same for all the samples. The phase retardation plate 35 in each of the first and the third to sixth samples is realized using a uniaxially oriented plate made of polycarbonate, while the phase retardation plate 35 in the second sample is constructed using a quarter wave plate manufactured by Nitto Denko.

In the first to sixth samples, the measured retardation value ReF of the phase retardation layer is 395 nm when the wavelength $\lambda$ of the incident light is 550 nm. The reference value CReF (1, 550) in expression (3), when the integer K is 1 and the wavelength $\lambda$ is 550, is the closest to the retardation value of 395 nm of the phase retardation layer. In the first to sixth samples, the measured retardation value ReL of the liquid crystal layer 33 is 808 nm when the wavelength $\lambda$ of the incident light is 589 nm, and 823 nm when the wavelength $\lambda$ of the incident light is 550 nm. In the first to sixth samples, the long axis/absorption crossing angle $\theta$ is set at 0.0°. The reference value CReL (2, 550) in expression (2), when the integer L is 2 and the wavelength $\lambda$ is 550, is the closest to the retardation value of 823 nm of the liquid crystal layer.

$$CReF(1, 550)=(1/4+1/2)\times 550 \text{ [nm]}=412.5 \text{ [nm]} \quad (11)$$

$$CReL(2, 550)=(1/2+2/2)\times 550 \text{ [nm]}=825 \text{ [nm]} \quad (12)$$

The retardation/absorption crossing angle $\Delta\phi$ in the first sample is set at 45°. That is, the first sample is a liquid crystal display device in which the phase retardation layer 35 is a quarter wave plate and the crossing angle $\Delta\phi$ between the retardation axis of the quarter wave plate and the absorption axis AP of the polarization layer is 45°. As shown in Table 2, in the first sample, the color tone of the pixel at the time of the ON voltage application is shifted from white toward yellow, while the color tone of the pixel at the time of the OFF voltage application is shifted from black toward purple. Though a contrast higher than 2 is achieved, the first sample is not desirable because of the occurrence of such color shifting. The contrast of the first sample is lower than the contrast 5.1 of the fourth sample that yields the best display results of the first to fifth samples. The contrast "2" is the lower limit value below which a viewability problem occurs in the liquid crystal display device. In the experiments described in this specification, the contrast "2" is used as the evaluation reference value.

When the phase retardation layer 35 is a quarter wave plate and the retardation/absorption crossing angle $\Delta\phi$ is 45°, the incident light is changed to circularly polarized light by passing through the polarization layer 34 and the phase retardation layer 35. The circularly polarized light entering the liquid crystal layer 33 is elliptically polarized because of the birefringent effect exhibited by the liquid crystal layer 33, and the resultant elliptically polarized light strikes the reflective layer. In the first sample, it is presumed that, since the light reflected by the reflective layer 36 is elliptically polarized light, the pixel color, which should be white at the time of the ON voltage application, is shifted to a yellowish tone and the pixel color, which should be black at the time of the OFF voltage application, is shifted to a purplish tone. This indicates that in a reflective liquid crystal display device, if a sufficient contrast is to be achieved while correcting the pixel color tone, it is required that the reflected light that enters the liquid crystal layer 33 from the opposite side 39 thereof be circularly polarized light.

In the liquid crystal display device of the invention, if the color shift is only the problem to consider, the retardation/absorption crossing angle $\Delta\phi$ should basically be set to a value larger than 0° and smaller than 90° but not at 45°. If the retardation/absorption crossing angle $\Delta\phi$ is 0° or 90°, in either case it will be difficult to improve the contrast and prevent the color shift at the same time.

Since the phase retardation layer used in the first sample is made of polycarbonate, this phase retardation layer exhibits chromatic dispersion. In the second sample, a wideband quarter wave plate was used in place of the polycarbonate phase retardation layer, and the same evaluation test as conducted on the first sample was repeated. The results showed that, compared with the first sample, the pixel color tone at the time of the ON voltage application shifted significantly toward yellow from white and the pixel color tone at the time of the OFF voltage application became red rather than black. Further, the contrast Co of the second sample was 1.9 which was worse than the contrast of the first sample.

Based on the measured results of the first and the third to six samples shown in Table 2, the dependence of the display state of the liquid crystal display device 31 on the retardation/absorption crossing angle $\Delta\phi$ was investigated. In the range of the retardation/absorption crossing angle $\Delta\phi$ not smaller than 40.0°, as can be seen from the measured results of the first, third, and fourth samples, the yellowishness of the white color tone at the time of the ON voltage application and the purplishness (reddishness) of the black color tone at the time of the OFF voltage application both decreased and the contrast Co increased as the retardation/absorption crossing angle $\Delta\phi$ was reduced. As can be seen from the measured results of the fourth sample, when the retardation/absorption crossing angle $\Delta\phi$ was 40°, the color shift both at the time of the ON voltage application and at the time of the OFF voltage application was minimized and the contrast Co was the greatest. In the range of the retardation/absorption crossing angle $\Delta\phi$ smaller than 40.0°, as can be seen from the measured results of the fifth and sixth samples, the white color tone at the time of the ON voltage application became more bluish, the black color at the time of the OFF voltage application became less crisp, and the contrast Co decreased as the retardation/absorption crossing angle $\Delta\phi$ was reduced.

From the results of the above investigation, it can be seen that the color shift in the white display as well as in the black display decreases and the contrast Co increases as the retardation/absorption crossing angle $\Delta\phi$ approaches 40°. Accordingly, the retardation/absorption crossing angle $\Delta\phi$ is preferably set as close as possible to 40°, and more preferably at 40° for optimum results. When the retardation/absorption crossing angle $\Delta\phi$ is set at 40°, the liquid crystal display device 31 of FIG. 1 can achieve optimum high contrast and optimum achromatization at the same time, since the incident light can be polarized into the more proper polarization state before it strikes the surface of the reflective layer 36.

It is preferable that the retardation/absorption crossing angle $\Delta\phi$ is set approximately at 40°. More specifically, the retardation/absorption crossing angle $\Delta\phi$ need not necessarily be limited to 40°, but may be set at any suitable value near 40°, for example, at 380 or 42°, as long as it is larger than 0° and smaller than 90° but not equal to 45°. The allowable range of the retardation/absorption crossing angle $\Delta\phi$ is a predetermined range centered about 40°, and it is considered that a range of 40°±3° is allowable.

Next, the second experiment will be described. The purpose of the second experiment is to investigate the dependence of the display state of the liquid crystal display device on the retardation value ReL of the liquid crystal layer. In the second experiment, four liquid crystal display devices as the seventh to 10th samples are used. The seventh to 10th samples are constructed so that the retardation value ReL of the liquid crystal layer differs among the samples; the retardation value ReF of the phase retardation layer, the retardation/absorption crossing angle $\Delta\phi$, and the long axis/absorption crossing angle $\theta$ are the same for all samples. For the seventh to 10th samples, the retardation value ReL of the liquid crystal layer is gradually increased. In the seventh to 10th samples, the measured retardation value ReF of the phase retardation layer is 395 nm. In the seventh to 10th samples, the retardation/absorption crossing angle $\Delta\phi$ is set at 40°, while the long axis/absorption crossing angle $\theta$ is set at 0.0°, The detailed design parameters for the seventh to 10th samples are shown in Table 1.

Based on the measured results of the seventh to 10th samples shown in Table 2, the dependence of the display state of the liquid crystal display device 31 on the retardation value ReL of the liquid crystal layer was investigated. As the results show, the highest contrast Co is achieved by the eighth sample, i.e., the liquid crystal display device in which the retardation value ReL of the liquid crystal layer is 782 nm when the wavelength $\lambda$ of the incident light is 589 nm. When the retardation value ReL of the liquid crystal layer is smaller than 782 nm, the contrast Co increases as the retardation value ReL increases. When the retardation value ReL of the liquid crystal layer is equal to or larger than 782 nm, the contrast Co decreases as the retardation value ReL increases. When the retardation value ReL of the liquid crystal layer was within the range of 755 nm to 836 nm, the contrast Co was constantly maintained at 2 or higher. Thus it can be seen that when the retardation value ReL of the liquid crystal layer is within the wave plate becomes difficult to obtain with the liquid crystal layer 33 since the retardation value ReL of the liquid crystal layer deviates widely from an integral multiple of one-half wavelength. For these reasons, it is preferable that the retardation value ReL of the liquid crystal layer is set to be larger than 740 nm and smaller than 840 nm. The range of values larger than 740 nm and smaller than 840 nm, which is the allowable range of the retardation value ReL of the liquid crystal layer when the wavelength $\lambda$ of the incident light is 589 nm, is equivalent to the range of values larger than 760 nm and smaller than 860 nm when the wavelength $\lambda$ of the incident light is 550 nm.

Next, the third experiment will be described. The purpose of the third experiment is to investigate the dependence of the display state of the liquid crystal display device on the retardation value ReF of the phase retardation layer. In the third experiment, six liquid crystal display devices as the 11th to 16th samples are used. The 11th to 16th samples are constructed so that the retardation value ReF of the phase retardation layer differs among the samples; the retardation value ReL of the liquid crystal layer, the retardation/absorption crossing angle $\Delta\phi$, and the long axis/absorption crossing angle $\theta$ are the same for all samples. For the 11th to 16th samples, the retardation value ReF of the phase retardation layer is gradually increased. In the 11th optimum range of 755 nm to 836 nm, the liquid crystal display device 31 can provide optimum contrast for sufficient viewability. The range of 755 nm to 836 nm, which is the optimum range of the retardation value ReL of the liquid crystal layer when the wavelength $\lambda$ of the incident light is 589 nm, is equivalent to the range of 770 nm to 856 nm when the wavelength $\lambda$ of the incident light is 550 nm.

The results of the second experiment show that the setting conditions of the eighth sample are the optimum conditions. Referring to the results of the second experiment, it will be seen that the contrast decreases monotonically as the setting conditions deviate from the setting conditions of the ninth sample. If the allowable limits of the contrast are estimated empirically based on the results of the second experiment, it is estimated that a viewable contrast can be obtained when the retardation value ReL of the liquid crystal layer is larger than 740 nm but smaller than 840 nm. This is presumably because the same effect as provided by a half wave plate is obtained by the liquid crystal layer 33 since the retardation value ReL of the liquid crystal layer becomes approximately equal to an integral multiple of one-half wavelength. If the retardation value ReL of the liquid crystal layer is 740 nm or smaller or 840 nm or larger, it is presumed that the contrast Co will fall short of the practical level. This is presumably because the same effect as provided by a half to 16th samples, the measured retardation value ReL of the liquid crystal layer is 808 nm when the wavelength $\lambda$ of the incident light is 589 nm, and 823 nm when the wavelength $\lambda$ of the incident light is 550 nm. In the 11th to 16th samples, the retardation/absorption crossing angle $\Delta\phi$ is set at 40°, while the long axis/absorption crossing angle $\theta$ is set at 0.0°. The detailed design parameters for the 11th to 16th samples are shown in Table 1.

Based on the measured results of the 11th to 16th samples shown in Table 2, the dependence of the display state of the liquid crystal display device on the retardation value ReF of the phase retardation layer was investigated. As the results show, the contrast Co is the highest when the retardation value ReF of the phase retardation layer is 395 nm for the incident light wavelength $\lambda$ of 550 nm. When the retardation value ReF of the phase retardation layer is smaller than 395 nm, the contrast Co increases as the retardation value ReF increases. When the retardation value of the phase retardation layer is equal to or larger than 395 nm, the contrast Co decreases as the retardation value ReF increases. As long as the retardation value ReF of the phase retardation layer remains within the range of 365 nm to 445 nm, the contrast Co is constantly maintained at 2 or higher. Thus it can be seen that when the retardation value ReF of the phase retardation layer is within the optimum range of 365 nm to 445 nm, the liquid crystal display device 31 can provide optimum contrast for sufficient viewability.

The results of the third experiment show that the setting conditions of the 14th sample are the optimum conditions. Referring to the results of the third experiment, it will be seen that the contrast decreases monotonically as the setting conditions deviate from the setting conditions of the 14th sample. If the allowable limits of the contrast are estimated empirically based on the results of the third experiment, it is estimated that a viewable contrast can be obtained when the retardation value ReF of the phase retardation layer is larger than 360 nm and smaller than 450 nm. This is presumably because the retardation value ReF of the phase retardation layer becomes approximately equal to a (2K+1)th multiple of one-quarter wavelength. If the retardation value ReF of the phase retardation layer is 360 nm or smaller or 450 nm or larger, it is presumed that the contrast Co will drop below the practical level. This is presumably because the retardation value ReF of the phase retardation layer deviates widely from the (2K+1)th multiple of one-quarter wavelength. For these reasons, it is seen that the retardation value ReF of the phase retardation layer is set preferably to be larger than 360 nm and smaller than 450 nm.

As described above, first the inventor obtained the conditions for the incident light to be polarized through the polarization layer 34 and phase retardation layer 35 into a state close to circular polarization when the light hit the surface of the liquid crystal layer 33. Then, by slightly varying the conditions obtained from the first sample, the inventor obtained the conditions for the incident light to be polarized through the polarization layer 34, phase retardation layer 35, and liquid crystal layer 33 into an ideal polarization state when the light reached the reflective layer 36. The ideal polarization state here refers to the polarization state that can prevent color shifting and improve the contrast, and more specifically, circular polarization or a polarization close to circular polarization.

From the results of the above experiments, it can be seen that if the phase retardation layer 35 is close in configuration to a quarter wave plate, and if the liquid crystal layer 33 is close in configuration to a half wave plate, then the polarization state of the incident light will have been optimized when the light reaches the reflective layer 36. A quarter wave plate is a phase retardation layer constructed so that its retardation value is set equal to the reference value CReF defined by expression (5), and so that its retardation axis makes an angle of 45° with the absorption axis of the polarization layer.

To construct the phase retardation layer 35 close in configuration to a quarter wave plate, the crossing angle $\Delta\phi$ between the absorption axis AP of the polarization layer 34 and the retardation axis of the phase retardation layer 35 should be displaced from 45°, and the retardation value ReF of the phase retardation layer 35 should be set approximately equal to CReF. By so doing, the polarization state of the incident light passed through the phase retardation layer becomes a state slightly displaced from circular polarization. To construct the liquid crystal layer 33 close in configuration to a half wave plate, the retardation value of the liquid crystal layer 33 should be set approximately equal to CReL. Then, the light of the polarization state slightly displaced from circular polarization, exiting the phase retardation layer, is optimized by being passed through the liquid crystal layer 33.

It is preferable that the retardation value ReF of the phase retardation layer is set to a value within ±15% of the reference value CReF, as shown by expression (13) below. The reason for this is as follows. When the integer K is 1 and the wavelength $\lambda$ of the light is 550 nm, for example, the reference value CReF for the retardation value of the phase retardation layer is given as 412.5 nm. According to the results of the second experiment, when the integer K is 1 and the wavelength $\lambda$ of the light is 550 nm, the retardation value ReF of the phase retardation layer should be set larger than 360 nm but smaller than 450 nm; therefore, the retardation value ReF of the phase retardation layer should be set at 412.5 nm±50 nm, as shown by expression (14) below. For this reason, it is preferable that the retardation value ReF of the phase retardation layer is set to a value within ±15% of the reference value CReF.

$$CReF \times 85\% \leq ReF \leq CReF \times 115\% \quad (13)$$

$$ReF \approx 412.5 \text{ nm} \pm 50 \text{ nm} \quad (14)$$

It is preferable that the retardation value ReL of the liquid crystal layer is set to a value within ±10% of the reference value CReL, as shown by expression (15) below. The reason for this is as follows. When the integer L is 2 and the wavelength $\lambda$ of the light is 550 nm, for example, the reference value CReL for the retardation value of the liquid crystal layer is given as 825 nm. According to the results of the third experiment, when the integer L is 2 and the wavelength $\lambda$ of the light is 550 nm, the retardation value ReL of the liquid crystal layer should be set larger than 760 nm but smaller than 860 nm; therefore, the retardation value ReL of the liquid crystal layer should be set at 825 nm±70 nm, as shown by expression (16) below. For this reason, it is preferable that the retardation value ReL of the liquid crystal layer is set to a value within ±10% of the reference value CReL.

$$CReL \times 90\% \leq ReL \leq CReL \times 110\% \quad (15)$$

$$ReL \approx 825 \text{ nm} \pm 70 \text{ nm} \quad (16)$$

If the phase retardation layer 35 and the liquid crystal layer 33 are designed to satisfy the above-described optimization conditions, the liquid crystal display device 31 can achieve a brighter white display and a higher contrast than the prior art liquid crystal display devices, while at the same time, achieving achromatization of white and black display colors. In particular, when the liquid crystal display device 31 is an STN liquid crystal display device which produces a display by utilizing the birefringent properties of the liquid crystal, the brightness of the white display can be further increased, thus further improving the contrast, while at the same time, further ensuring the achromatization of white and black display colors.

In the liquid crystal display device 31 of FIG. 1, by being passed through the polarization layer 34 and phase retardation layer 35 the incident light is converted to elliptically polarized light whose state is close to that of circularly polarized light. The reason for this is as follows. In the case of a liquid crystal display device having a single polarization layer, a single optical compensation layer, and a reflective layer, and using a quarter wave plate as the optical compensation layer, in theory the ambient light entering the liquid crystal display device is first confined to linear polarization as it passes through the polarization layer. The linearly polarized light is changed to circularly polarized light by being passed through the quarter wave plate. The circularly polarized light is passed through the liquid crystal layer unchanged, and thus the circularly polarized light reaches the reflective layer. In reality, however, the amount of birefringence in the quarter wave plate has a wavelength dependence unique to the material of the quarter wave plate, and likewise, the amount of birefringence in the liquid crystal layer has a wavelength dependence unique to the material of the liquid crystal layer; as a result, in the liquid crystal display device of the above construction, the polarization state of the light reaching the reflective layer is displaced from the ideal polarization state, that is, the light is not circularly polarized light in the visible wavelength region. In view of this, in the present embodiment, the polarization state of the light reaching the reflective layer is optimized by deliberately displacing the polarization state of the light passed through the optical compensation layer from the theoretical state. For this reason, the incident light when passing through the phase retardation layer 35 is converted to elliptically polarized light whose state is close to that of circularly polarized light. The amount of displacement from circular polarization, which is dependent on the configuration of the phase retardation layer 35, is determined by the degree of the birefringent effect of the liquid crystal. Since the incident light exiting the phase retardation layer is elliptically polarized light whose state is close to that of circularly polarized light, the polarization state of the incident light to be reflected by the surface of the reflective layer 36 is further optimized. As a result, the liquid crystal display device 31 can further improve the contrast and can achieve achromatization by further reducing color shifting in the white and black display states.

Figure 3:
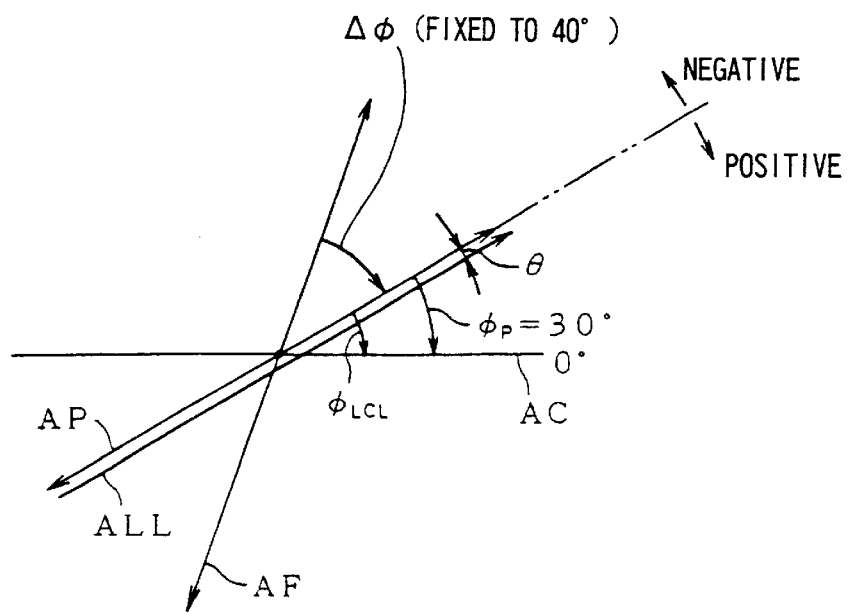
FIG. 3 is a diagram showing how the crossing angle θ between the absorption axis AP of a polarizer and the long axis direction of liquid crystal molecules lying closest to a reflective layer is changed in an experiment for evaluating the liquid crystal display device 31.

Next, the fourth experiment will be described. The purpose of the fourth experiment is to investigate the dependence of the display state of the liquid crystal display device on the long axis/absorption crossing angle θ. In the fourth experiment, five liquid crystal display devices as the 17th to 21st samples are used. The 17th to 21st samples are constructed so that the long axis/absorption crossing angle θ differs among the samples; the retardation values ReL and ReF of the liquid crystal layer and the phase retardation layer and the retardation/absorption crossing angle Δφ are the same for all samples. The detailed design parameters for the 17th to 21st samples are shown in Table 1. As shown in FIG. 3, the long axis/absorption crossing angle θ was varied by varying the angle φP of the absorption axis AP of the polarization layer 34 from sample to sample while holding fixed the angle φLCL of the long axis direction ALL of the liquid crystal molecules lying closest to the opposite side 39 of the liquid crystal layer. The angle φF of the retardation axis AF of the phase retardation layer 35 is set for each particular sample so that each sample has an equal retardation/absorption crossing angle Δφ. In the 17th to 21st samples, the measured retardation value ReF of the phase retardation layer is 395 nm. In the 17th to 21st samples, the measured retardation value ReL of the liquid crystal layer is 808 nm when the wavelength λ of the incident light is 589 nm. The retardation/absorption crossing angle Δφ in each sample is set at 40°.

Based on the measured results of the 17th to 21st samples, the dependence of the display state of the liquid crystal display device on the long axis/absorption crossing angle θ was investigated. In the positive value range of the long axis/absorption crossing angle θ, the contrast Co decreased as the absolute value of the long axis/absorption crossing angle θ increased, and the color tone at the time of the ON voltage application shifted toward a reddish tone. In the negative value range of the long axis/absorption crossing angle θ, the contrast Co increased as the absolute value of the long axis/absorption crossing angle θ increased, and the color tone at the time of the OFF voltage application shifted toward a bluish tone. This shows that the closer to 0° the absolute value of the long axis/absorption crossing angle θ is, the more desirable. When the long axis/absorption crossing angle θ is less than −10° or more than +10°, the color shift at the time of the ON voltage application as well as at the time of the OFF voltage application increases beyond the practical level. When the long axis/absorption crossing angle θ is within the range of −10° to +10°, the color shift at the time of the ON voltage application as well as at the time of the OFF voltage application is reduced to a sufficiently small level for practical use. From the above results, it can be seen that the viewability allowable range of the long axis/absorption crossing angle θ is from −10° to +10°, and that 0° is the optimum long axis/absorption crossing angle θ.

It is preferable that the phase retardation layer 35 is realized using a uniaxially oriented film, that is, a phase retardation film formed, for example, by uniaxially stretching a polymer film. This serves to reduce the cost of the phase retardation film.

The present embodiment has been described and evaluated, based on black and white liquid crystal display devices in which no color filter layers are provided and in which the reflective layer 36 is disposed on the outside of the second substrate. The liquid crystal display device of the invention, however, does not impose any specific restrictions to the location of the reflective layer. Accordingly, the reflective layer 36 need not necessarily be located outside the liquid crystal cell 31, but may be formed within the liquid crystal cell 31. As a second embodiment of the invention, a liquid crystal display device in which the reflective layer 36 is formed within the liquid crystal cell 31 will be described.

When forming the reflective layer 36 within the liquid crystal cell 31, the reflective layer 36 is, in principle, placed between the liquid crystal layer 33 and the second substrate 44. This serves to reduce light loss since at least the second substrate 44 is located outside the path of the incident light and the reflected light. When the reflective layer 36 is placed within the liquid crystal cell 31, the liquid crystal display device 31 can alleviate not only the reflectivity degradation problem of the liquid crystal display device caused by the second substrate 44, but also the parallax associated with the thickness of the second substrate 44.

When forming the reflective layer 36 within the liquid crystal cell 31, an element to be disposed on the opposite side 39 of the liquid crystal layer 33 may be constructed to also serve the function of the reflective layer 36 by designing it to have a light reflecting function. If the reflective layer 36 and any one of the elements on the opposite side 39 are formed together as a single element rather than forming them separately, the material consumed in the fabrication of the liquid crystal display device 31 can be saved and also, the fabrication process of the liquid crystal display device 31 can be simplified, serving to reduce the cost of the liquid crystal display device.

Figure 4:
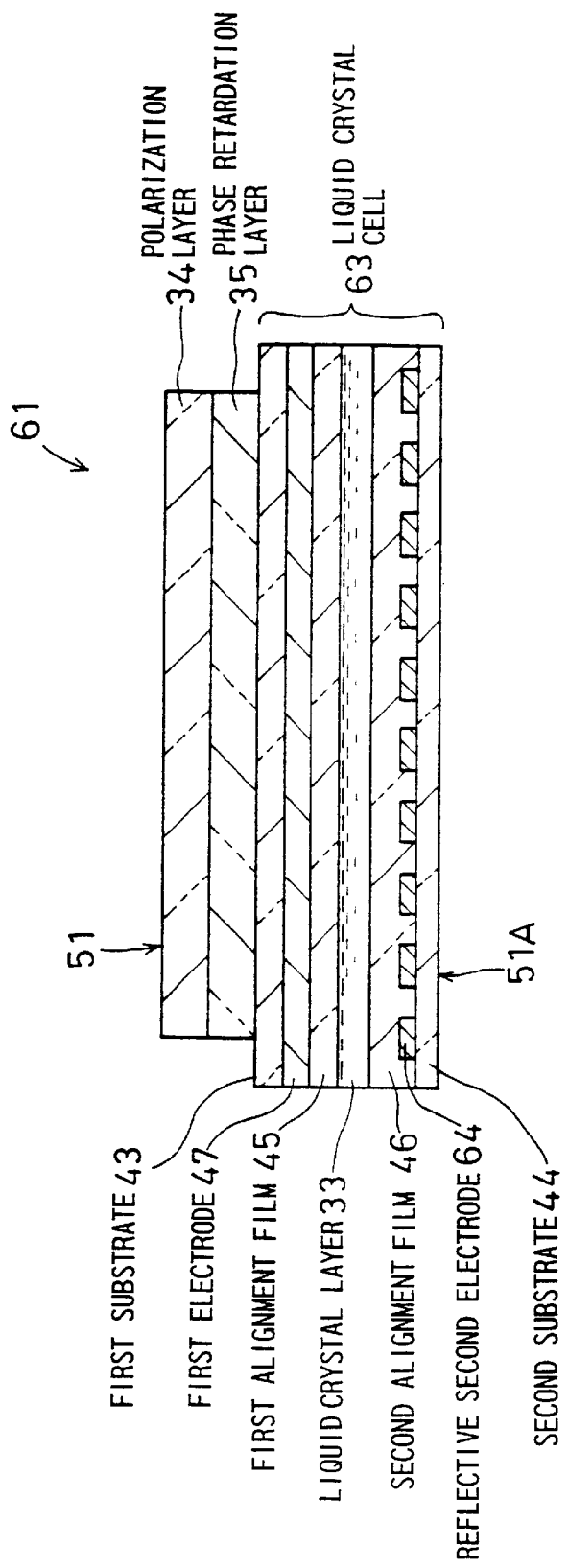
FIG. 4 is a diagrammatic cross sectional view showing the structure of a reflective liquid crystal display device 61 according to a second embodiment of the invention in which a second electrode also serves as a reflective layer.

FIG. 4 is a diagrammatic cross sectional view showing the structure of the liquid crystal display device 61 according to the second embodiment in which the second electrode array 64 are constructed to also serve as the reflective layer 36. The liquid crystal display device 61 of FIG. 4 differs from the liquid crystal display device 31 of FIG. 1 in that the second electrode array 64 formed within the liquid crystal cell 63 is provided with a reflecting function and, therefore, the reflective layer 36 is omitted. The second electrode array having the reflecting function is referred to as the "reflective second electrode array". The liquid crystal cell 63 in FIG. 4 is identical in structure to the liquid crystal cell 41 in FIG. 1, except that the second transparent electrode array 48 in the latter is replaced with the reflective second electrode array 64. The constituent elements of the liquid crystal display device 61 of FIG. 4, other than the second electrode array 64, are identical in structure to the corresponding elements of the liquid crystal display device 31 of FIG. 1. In the example of FIG. 4, the second substrate 44 need not necessarily be transparent. In the liquid crystal display device 61 of FIG. 4, since the reflective second electrode array 64 also serves the function of the reflective layer, the cost of the liquid crystal display device can be reduced. In this specification, in the description of each liquid crystal display device hereinafter given, the same elements as those in the previously described liquid crystal display device will be designated by the same reference numerals, and will not be described in detail.

When the second electrode array 64 is constructed to also serve the function of the reflective layer, if a light scattering effect is provided to the reflective second electrode array 64 by forming raised and recessed portions thereon by etching, the electric field applied to the liquid crystal layer will become nonuniform because of the nonuniformity of the electrode geometry. To prevent the nonuniformity of the electric field, it is desirable that the surface of the reflective second electrode 64 be planarized. More specifically, it is desirable that the reflective second electrode 64 be formed as a specular reflective layer. When the surface of the reflective second electrode 64 is planarized, it is preferable that the liquid crystal display device 61 further includes a scattering layer having a light scattering property. Such a scattering layer should be located nearer to the display surface 51 than the reflective second electrode array 64 is in the liquid crystal display device 61. The scattering film is formed from a film having a light scattering property.

Figure 5A:
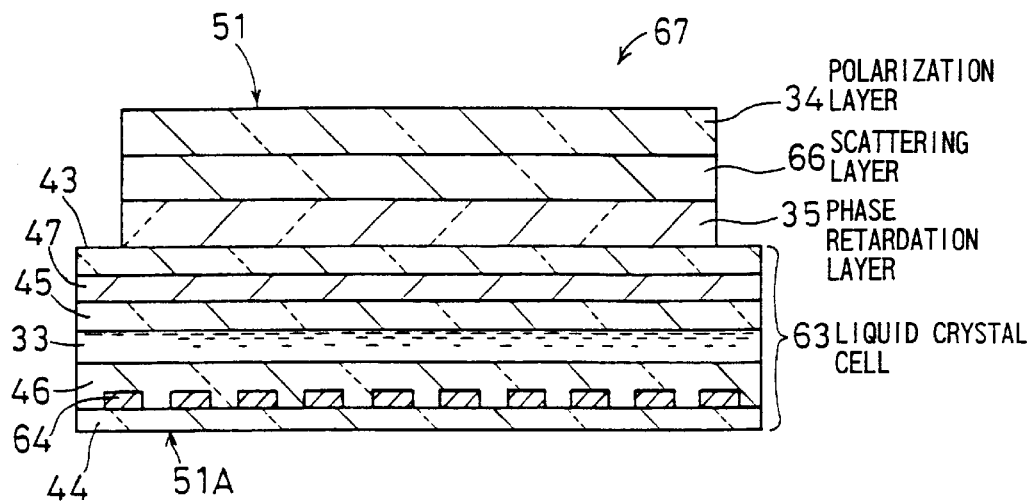
FIGS. 5A and 5B are diagrammatic cross sectional views showing the structures of reflective liquid crystal display devices 67 and 68, each further including a scattering layer, in which the second electrode is constructed to also serve as a reflective layer.
Figure 5B:
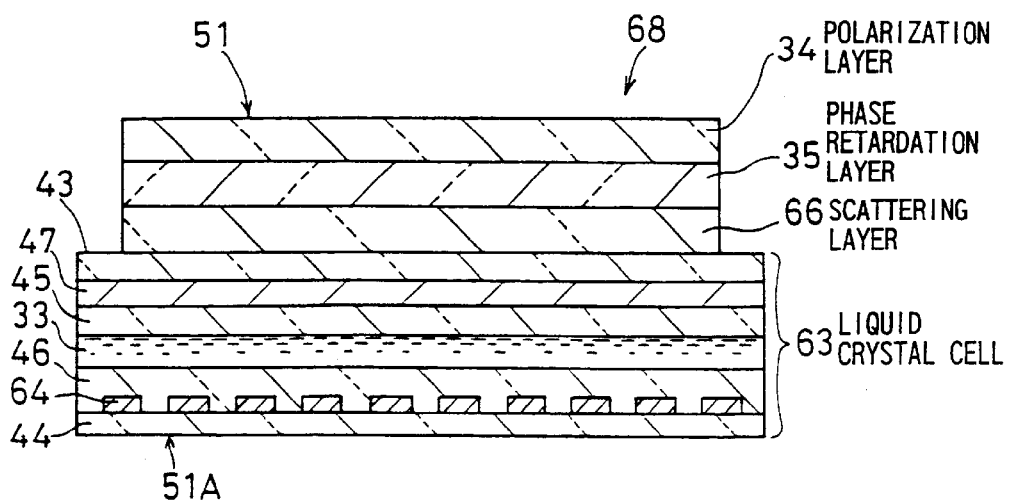

The inventor conducted a fifth experiment, as described below, in order to evaluate the scattering layer and the reflective second electrode array 64 as the specular reflective layer. In the fifth experiment, three liquid crystal display devices as the 22nd to 24th samples were fabricated, and the lightness of the display surface 51 of each sample in the white display state was evaluated by a visual method. The 22nd sample does not include a scattering layer and is identical in structure to the liquid crystal display device 61 of FIG. 4. The 23rd sample has the structure shown in FIG. 5A in which the scattering layer 66 is placed between the polarization layer 34 and the phase retardation layer 35. The 24th sample has the structure shown in FIG. 5B in which the scattering layer 66 is placed between the phase retardation layer 35 and the liquid crystal cell 41. The two liquid crystal display devices 67 and 68 shown in FIGS. 5A and 5B are fundamentally the same in structure as the liquid crystal display device 61 shown in FIG. 4, except the inclusion of the scattering layer 66. The 22nd to 24th samples are designed to satisfy the conditions described in relation to the fourth sample in the first embodiment.

According to the results of the fifth experiment, the apparent pixel lightness of the 22nd sample in the white display state is low because the screen is bright in a localized area when viewed in a direction coinciding with the positive reflection direction of the incident light but is dark when viewed in other directions. In the 23rd and 24th samples each of which is provided with the scattering layer 66, the reflected light, which illuminated the localized area on the display surface 51 of the 22nd sample, is suitably scattered by the scattering layer 66. Therefore, the apparent pixel lightness of each of the 23rd and 24th samples in the white display state is higher than that of the 22nd sample. In this way, in the case of the liquid crystal display device 61 having the scattering layer 66, the positive reflection component of the light reflected by the reflective second electrode array 64 functioning as the specular reflective layer can be suitably scattered in the viewing direction. This increases the apparent pixel lightness, further improving the display quality of the liquid crystal display device.

A comparison between the display states of the 23rd and 24th samples showed that the blurring caused by the light scattering was alleviated in the 24th sample compared with the 23rd sample. In this way, placing the scattering layer 66 between the phase retardation layer 35 and the liquid crystal layer 33 is preferable to placing the scattering layer 66 on the display surface 51 side of the phase retardation layer 35, because the surface reflection of the scattering layer 66 can then be reduced, alleviating the display blurring caused by the scattering. Furthermore, if the scattering layer 66 is formed from a scattering film having the property of scattering much of the light in the forward direction, i.e., in the traveling direction of the light, the display blurring caused by the scattering can be further alleviated. This was confirmed as the result of the fifth experiment.

In the liquid crystal display device 31 of the first embodiment, the reflective layer 36 may be implemented as a light-semitransmitting reflective layer which reflects only a portion of incoming light, allowing the remaining portion of the light to pass through. In the liquid crystal display device 61 of the second embodiment, the reflective second electrode array 64 may be constructed to also serve as a light-transmitting reflective layer by conferring the property that reflects a portion of incoming light and allows the remaining portion of the light to pass through. As a third embodiment of the invention, a liquid crystal display device having a light-semitransmitting reflective layer 73 instead of the reflective layer 36 will be described below. The liquid crystal display device of the invention having the light-semitransmitting reflective layer 73 is a light-semitransmitting type liquid crystal display device which combines the characteristics of a reflective liquid crystal display device with the characteristics of a light-transmitting type liquid crystal display device. The light-semitransmitting type liquid crystal display device can produce a display by using not only the reflected light of the incident light entering the device from the display surface 51 side but also the light entering the device from behind the rear surface 51A. Therefore, when a backlight source is disposed on the rear surface 51A side of the light-semitransmitting reflective layer, for example, the light-semitransmitting type liquid crystal display device can be used if no ambient light is available.

It is preferable that the light-semitransmitting type liquid crystal display device further includes a circular polarization selecting layer 74 on the rear surface 51A side of the light-semitransmitting reflective layer 73. When a light source 79 is disposed on the rear surface 51A side of the light-semitransmitting type liquid crystal display device, the circular polarization selecting layer 74 is placed between the liquid crystal layer 33 and the light source 79. Of the incident light, only circularly polarized light is selectively passed through the circular polarization selecting layer 74. More preferably, the circular polarization selecting layer 74 is placed between the light-semitransmitting reflective layer 73 and the light source 79.

Figure 6A:
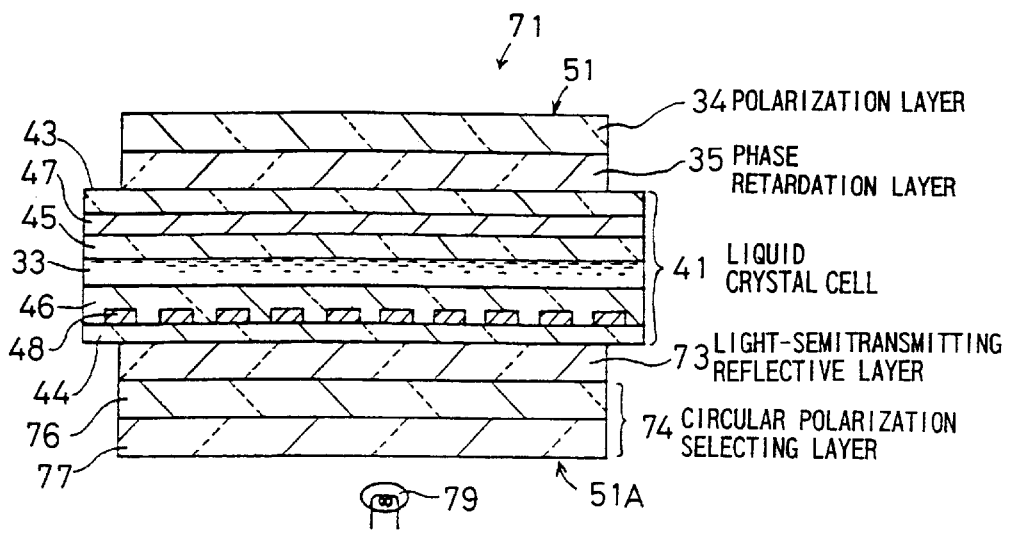
FIGS. 6A and 6B are diagrammatic cross sectional views showing the structures of light-semitransmitting type liquid crystal display devices 71 and 72 according to a third embodiment of the invention, each further including a circular polarization selecting layer.
Figure 6B:
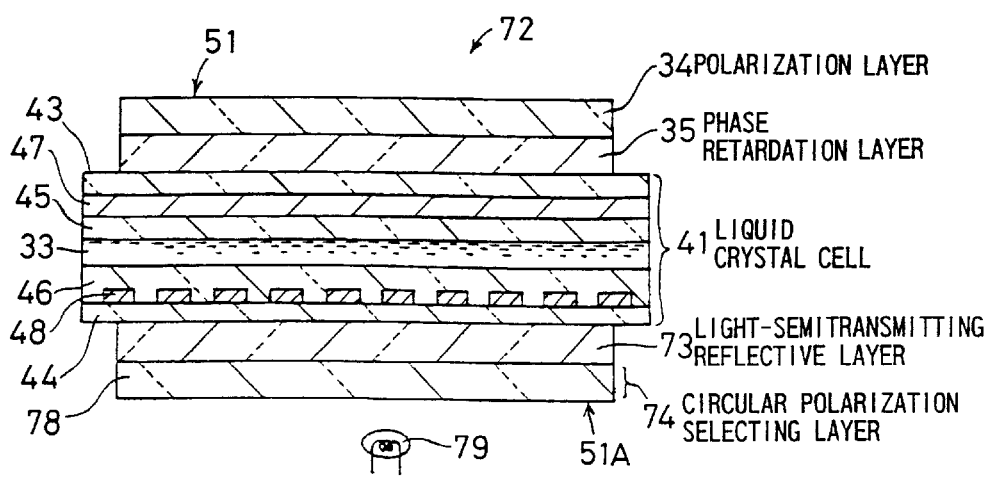
Figure 9:
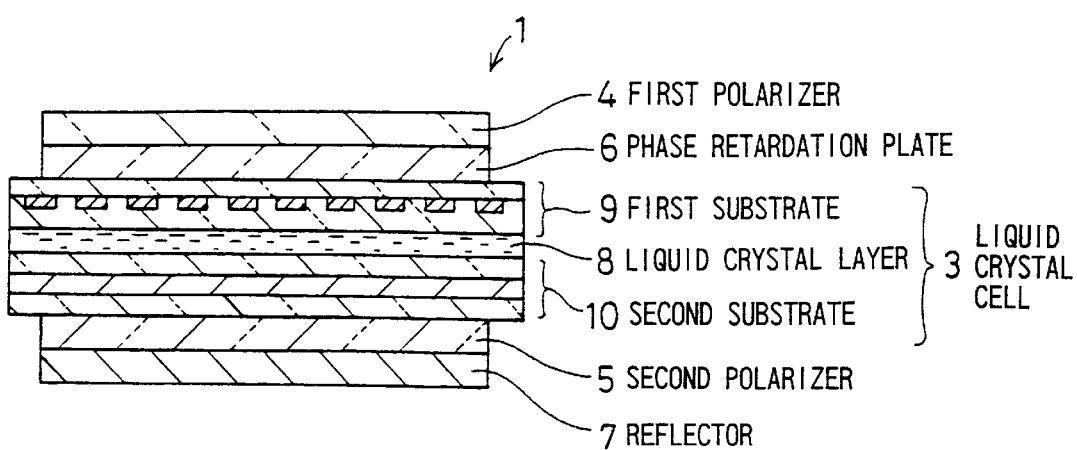
FIG. 9 is a diagrammatic cross sectional view showing the structure of a prior art reflective liquid crystal display device having two polarization layers.
Figure 10:
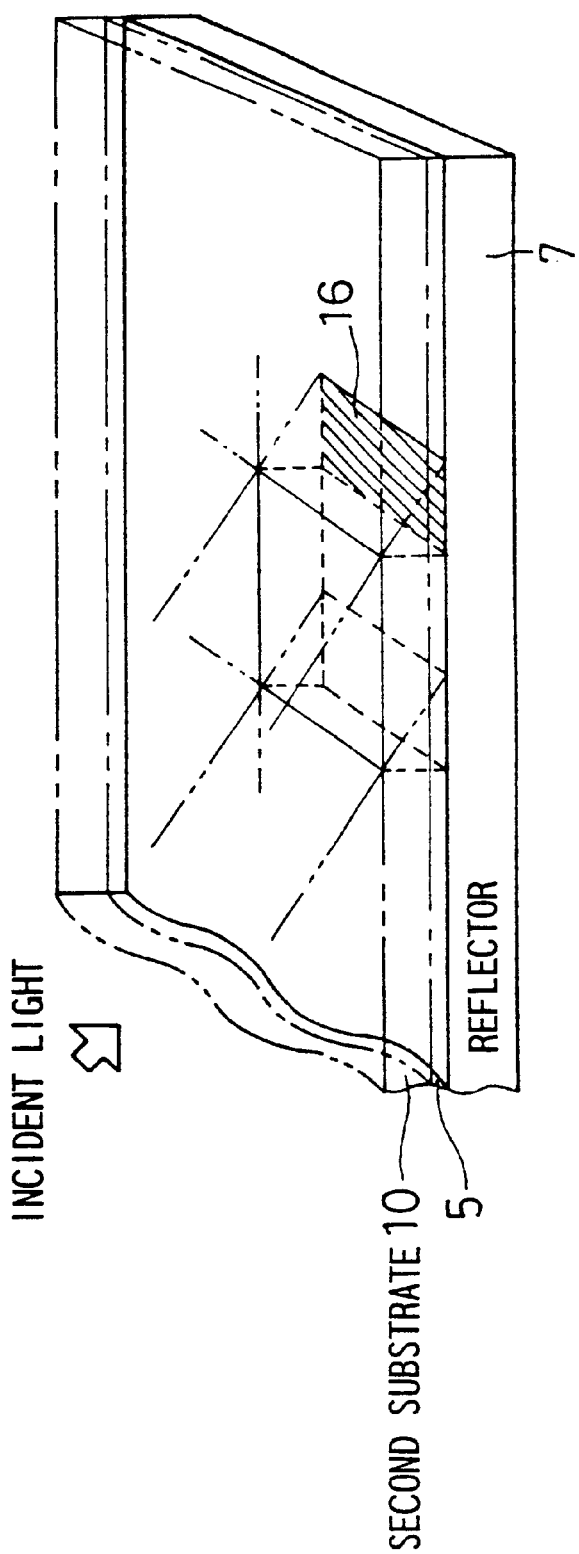
FIG. 10 is a diagram illustrating the behavior of light incident obliquely on the liquid crystal display device of FIG. 9.
Figure 11:
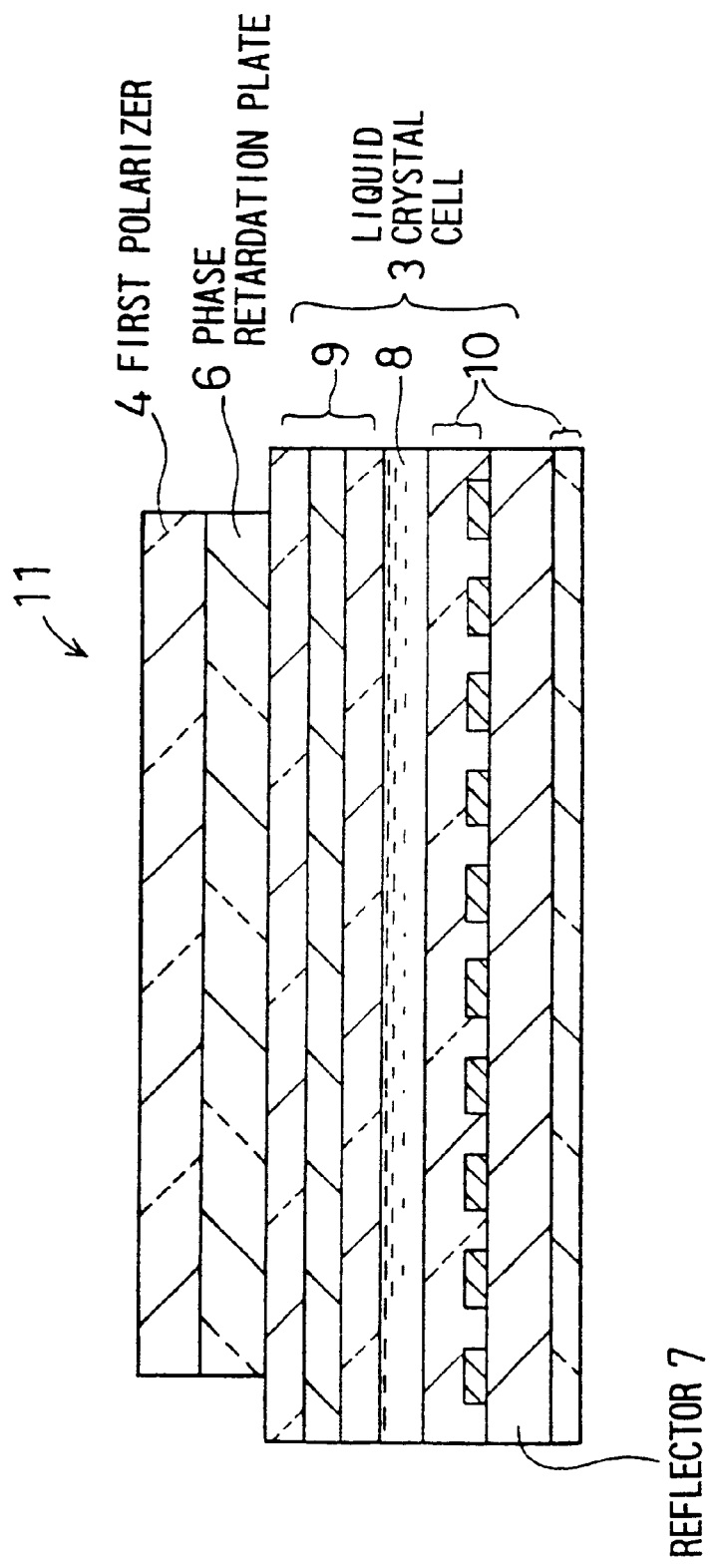
FIG. 11 is a diagrammatic cross sectional view showing the structure of a prior art reflective liquid crystal display device having a single polarizer.
Figure 12A:
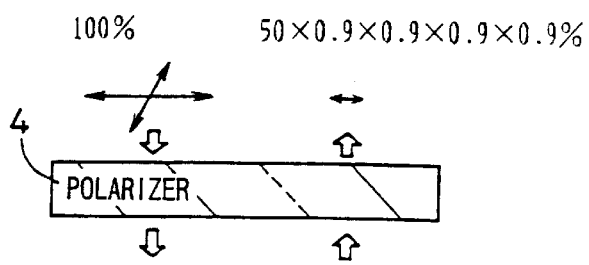
FIGS. 12A and 12B are schematic diagrams illustrating the principle of driving a pixel for display in the liquid crystal display devices of FIGS. 9 and 11.
Figure 12B:
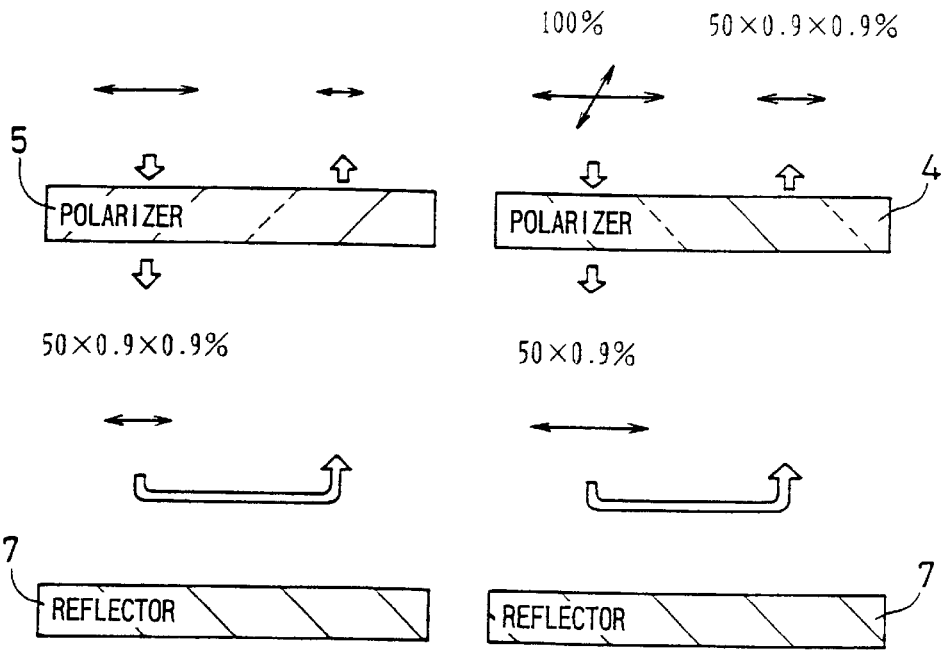

FIG. 6A is a diagrammatic cross sectional view showing the structure of a first light-semitransmitting type liquid crystal display device 71 having the circular polarization selecting layer 74. FIG. 6B is a diagrammatic cross sectional view showing the structure of a second light-semitransmitting type liquid crystal display device 72 having the circular polarization selecting layer 74. The two liquid crystal display devices 71 and 72 shown in FIGS. 6A and 6B differ in structure from the liquid crystal display device 31 of FIG. 1 in that the reflective layer 36 in the latter is replaced with the light-semitransmitting reflective layer 73, and in that the circular polarization selecting layer 74 is added; the other elements are identical in structure to the corresponding elements in the liquid crystal display device 31 of FIG. 1.

In the liquid crystal display device 71 of FIG. 6A, the circular polarization selecting layer 74 includes a quarter wave layer 76 and a polarization layer 77 for transmitting therethrough only a linearly polarized component. The quarter wave layer 76 is placed between the liquid crystal layer 33 and the polarization layer 77 that transmits only the linearly polarized component. In the liquid crystal display device 72 of FIG. 6B, the circular polarization selecting layer 74 is implemented as a circular polarization selective reflecting layer 78. The circular polarization selective reflecting layer 78 decomposes the incident light into a right-hand polarization component, which is a right-hand circularly polarized component, and a left-hand polarization component, which is a left-hand circularly polarized component, and reflects either one of the right-hand and left-hand polarization components, allowing the other to pass through. As a result, in theory the circular polarization selective reflecting layer 78 reflects 50% of the incident light and transmits the remaining 50% of the incident light. The circular polarization selective reflecting layer 78 is realized using a cholesteric film.

FIG. 7A is a diagram for explaining the principle for driving a pixel for display at the time of the OFF voltage application in the reflective mode of the light-semitransmitting type liquid crystal display device 71 of FIG. 6A. The OFF voltage is set so that the liquid crystal layer 33 of the pixel, at the time of the OFF voltage application, exhibits birefringence of the amount just enough to change the elliptically polarized light emerging from the phase retardation layer 35 into circularly polarized light. Of the light entering the liquid crystal display device 71 from the display surface 51, only the linearly polarized light 91 whose direction of vibration is orthogonal to the absorption axis AP is allowed to pass through the polarization layer 34. The linearly polarized light 91 is changed to elliptically polarized light by passing through the phase retardation layer 35, and when passed through the liquid crystal layer 33 to which the OFF voltage is applied, the polarized light has a polarization state 93 close to circular polarization. The light of the polarization state 93 close to circular polarization is reflected by the light-semitransmitting reflective layer 73 without its polarization state being changed. The reflected circularly polarized light 94 is changed to linearly polarized light 94 whose direction of vibration is parallel to the absorption axis AP, by passing through the liquid crystal layer 33 to which the OFF voltage is applied and then through the phase retardation layer 35. The direction of vibration of the linearly polarized light 94 emerging from the phase retardation layer 35 is orthogonal to the direction of vibration of the linearly polarized light 91 emerging from the polarization layer 34. Since the direction of vibration of the linearly polarized light 94 emerging from the phase retardation layer 35 is parallel to the absorption axis AP, the linearly polarized light 94 is absorbed or scattered by the polarization layer 34. As a result, no light emerges from the display surface 51, so the pixel appears black.

FIG. 7B is a diagram for explaining the principle for driving a pixel for display at the time of the ON voltage application in the reflective mode of the light-semitransmitting type liquid crystal display device 71 of FIG. 6A. The ON voltage is set so that the liquid crystal layer 33 of the pixel, at the time of the ON voltage application, exhibits birefringence of the amount just enough to change the elliptically polarized light emerging from the phase retardation layer into elliptically polarized light whose long axis is parallel or substantially parallel to the absorption axis AP. Of the light entering the liquid crystal display device 71 from the display surface 51, only the linearly polarized light 91 whose direction of vibration is orthogonal to the absorption axis AP is allowed to pass through the polarization layer 34. The linearly polarized light 91 is changed to elliptically polarized light by passing through the phase retardation layer 35, and when passed through the liquid crystal layer 33 to which the ON voltage is applied, the polarized light is changed to elliptically polarized light 95 whose long axis is substantially parallel to the absorption axis AP. The elliptically polarized light 95 is reflected by the light-semitransmitting reflective layer 73 without its polarization state being changed. The reflected elliptically polarized light 95 is changed to elliptically polarized light 96 whose short axis is substantially parallel to the absorption axis AP, by passing through the liquid crystal layer 33 to which the ON voltage is applied and then through the phase retardation layer 35. Of the elliptically polarized light 96 passed through the phase retardation layer 35, only the polarization component 97 orthogonal to the absorption axis AP is allowed to pass through the polarization layer 34, and the remaining polarization components are absorbed or scattered by the polarization layer 34. As a result, the polarization component 97 emerges from the display surface 51, causing the pixel to appear white.

In this way, when ambient light entering from the display surface 51 is available, the light-semitransmitting type liquid crystal display device 71 can drive the pixel in a white display state or a black display state according to the voltage applied to the liquid crystal layer 33, by utilizing the reflected light. The reflective mode display principle of the light-semitransmitting type liquid crystal display device 72 is fundamentally the same as the display principle described with reference to FIGS. 7A and 7B. The display principle described with reference to FIGS. 7A and 7B is fundamentally the same as the display principle of each of the liquid crystal display devices described with reference to FIGS. 1 to 6, if the light-semitransmitting reflective layer 73 is replaced with the reflective layer 36.

FIG. 8A is a diagram for explaining the principle for driving a pixel for display in the light transmitting mode of the light-semitransmitting type liquid crystal display device 71 of FIG. 6A. In the light-transmitting mode of the light-semitransmitting type liquid crystal display device 71, between the OFF voltage application and the ON voltage application there is no difference in the behavior of the light passing through the circular polarization selecting layer 74 or through the light-semitransmitting reflective layer 73. The light used for display, for example, the light emitted from the light source 79, enters the liquid crystal display device 71 from behind the rear surface 51A of the liquid crystal display device 71. Of the light entering from behind the rear surface 51A, only the linearly polarized light 101 whose direction of vibration is orthogonal to the absorption axis of the polarization layer 77 in the circular polarization selecting layer 74 is allowed to pass through the polarization layer 77. The linearly polarized light 101 is changed to circularly polarized light 102 by passing through the quarter wave layer 76. The circularly polarized light 102 is passed through the light-semitransmitting reflective layer 73 without its polarization state being changed. The circularly polarized light thus enters the liquid crystal layer 33 from the opposite side 39 thereof. In this way, the circular polarization selecting layer 74, which combines the quarter wave layer 76 with the polarization layer 77, can circularly polarize the incident light, thus allowing the circularly polarized light to enter the liquid crystal layer 33 from the opposite side 39 thereof.

At the time of the OFF voltage application, the circularly polarized light 102 is changed to linearly polarized light 94 whose direction of vibration is parallel to the absorption axis AP of the polarization layer 34, by passing through the liquid crystal layer 33 to which the OFF voltage is applied and through the phase retardation layer 35. The linearly polarized light 94 passed through the phase retardation layer 35 is absorbed or scattered by the polarization layer 34. As a result, no light emerges from the display surface 51, so the pixel appears black. At the time of the ON voltage application, the circularly polarized light 102 is changed to elliptically polarized light 96 whose short axis is substantially parallel to the absorption axis AP, by passing through the liquid crystal layer 33 to which the ON voltage is applied and through the phase retardation layer 35. Of the elliptically polarized light 96 passed through the phase retardation layer 35, only the polarization component orthogonal to the absorption axis AP is allowed to pass through the polarization layer 34, and the other polarization components are absorbed or scattered by the polarization layer 34. As a result, the polarization component 97 emerges from the display surface 51, causing the pixel to appear white. In this way, when light entering from behind the rear surface 51A is available, the light-semitransmitting type liquid crystal display device 71 can drive the pixel in a white display state or a black display state according to the voltage applied to the liquid crystal layer 33, by utilizing the light entering from behind the rear surface 51A.

FIG. 8B is a diagram for explaining the principle for driving a pixel for display in the light-transmitting mode of the light-semitransmitting type liquid crystal display device 72 of FIG. 6B. In the light-transmitting mode of the light-semitransmitting type liquid crystal display device 72, between the OFF voltage application and the ON voltage application there is no difference in the behavior of the light passing through the circular polarization selecting layer 74 or through the light-semitransmitting reflective layer 73. Of the light entering from behind the rear surface 51A, the right-hand circularly polarized component or left-hand circularly polarized component 105 is selectively allowed to pass through the circular polarization selective reflecting layer 78. As a result, the circularly polarized light 105 enters the liquid crystal layer 33 from the opposite side 39 thereof. In this way, the circular polarization selecting layer 74 formed from the circular polarization selective reflecting layer 78 selectively transmits the right-hand or left-hand circularly polarized light, thus allowing the circularly polarized light to enter the liquid crystal layer 33 from the opposite side 39 thereof. The behavior of the circularly polarized light 105 in the path from the liquid crystal layer 33 to the polarization layer 34 is the same as that of the circularly polarized light 102 in the path from the liquid crystal layer 33 to the polarization layer 34 in FIG. 8A. Accordingly, when light entering from behind the rear surface 51A is available, the light-semitransmitting type liquid crystal display device 72 of FIG. 6B can drive the pixel in a white display state or a black display state according to the voltage applied to the liquid crystal layer 33, by utilizing the light entering from behind the rear surface 51A.

In a liquid crystal display device having a single polarization layer and a single phase retardation layer, it is preferable that the light that enters the liquid crystal layer 33 from behind the opposite side 39 thereof, that is, the light used for display, is circularly polarized at least when producing a black display. In the light-semitransmitting type liquid crystal display devices 71 and 72, the light that enters the liquid crystal layer 33 from behind the opposite side 39 thereof is already confined by the circular polarization selecting layer 74 to a polarization state close to circular polarization, just like the light that is reflected by the reflective layer 36 and reenters the liquid crystal layer 33. Thus, the polarization state of the light used for display in the light-transmitting mode, like the light used for display in the reflective mode, is optimized to prevent the color shift and improve the contrast. In this way, the light-semitransmitting type liquid crystal display devices 71 and 72, whether in the reflective mode or the light-transmitting mode, can achieve a brighter white display and a higher contrast than the prior art liquid crystal display devices, while at the same time, achieving achromatization of white and black display colors.

To evaluate the light-semitransmitting type liquid crystal display devices 71 and 72 shown in FIGS. 6A and 6B, the inventor conducted a sixth experiment as described below. In the sixth experiment, two light-semitransmitting type liquid crystal display devices as the 25th and 26th samples were fabricated, and the display state of each light-semitransmitting type liquid crystal display device was observed in the reflective mode in which reflected light was used for display as well as in the light-transmitting mode in which the light passed through the light-semitransmitting reflective layer was used for display. The 25th sample was fabricated by mounting a backlight on the side of the liquid crystal display device 71 of FIG. 6A opposite from the display surface 51 side thereof. The 26th sample was fabricated by mounting a backlight on the side of the liquid crystal display device 72 of FIG. 6B opposite from the display surface 51 side thereof. According to the results of the sixth experiment, the 25th sample was able to produce a black display when the OFF voltage was applied and a white display when the ON voltage was applied as shown in FIG. 7 in the reflective mode and, likewise, was able to produce a black display when the OFF voltage was applied and a white display when the ON voltage was applied as shown in FIG. 8A in the light-transmitting mode. Similarly, the 26th sample was able to produce a black display when the OFF voltage was applied and a white display when the ON voltage was applied as shown in FIG. 7 in the reflective mode and, likewise, was able to produce a black display when the OFF voltage was applied and a white display when the ON voltage was applied as shown in FIG. 8B in the light-transmitting mode.

As described above, the liquid crystal display devices of the first to third embodiments each include a single polarization layer and a single phase retardation layer, and produce a display by utilizing the reflected light while correcting for the effects of the wavelength dependence of optical birefringence. In the liquid crystal display device as described in each embodiment, especially in the case of an STN liquid crystal display device which produces a display by utilizing the birefringence properties of the liquid crystal, the brightness of the white display can be increased, thus achieving high contrast, while at the same time, achieving achromatization of white and black display colors. The liquid crystal display devices of the first to third embodiments are examples only illustrative of the invention, and can be carried out in various ways as long as the same essential structure is employed. Specifically, the detailed structure of each element is not limited to that described in this specification but may be modified or implemented in other ways as long as the same effect as intended for the element can be obtained.

The first to third embodiments have been described and evaluated, based on black and white liquid crystal display devices in which no color filter layers are provided. The invention aims at realizing a liquid crystal display device that achieves a brighter white display and a higher contrast than any of the prior art liquid crystal display devices, while at the same time, achieving achromatization of white and black display colors. Accordingly, the techniques disclosed in relation to the black and white liquid crystal display devices described in this specification can be applied to color liquid crystal display devices. Furthermore, the techniques disclosed in relation to the black and white liquid crystal display devices described in this specification can be used not only for liquid crystal display devices having an STN liquid crystal layer but also for other liquid crystal display devices that utilize the birefringence properties of the liquid crystal layer. Using an STN liquid crystal layer is preferable to using other types of liquid crystal layer because the pixel lightness in a white display state can be increased.

The liquid crystal display devices of the first to third embodiments described above are not only thinner and lighter than the prior art liquid crystal display devices but also superior in the pixel lightness in the white display state, and therefore are suitable as display devices, for example, for portable terminals such as portable telephones.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A liquid crystal display device comprising:
   a polarization layer for transmitting therethrough only a linearly polarized component of incident light, which is polarized in a predetermined direction;
   a reflective layer for reflecting light;

a single phase retardation layer disposed between the polarization layer and the reflective layer; and a super-twisted nematic liquid crystal layer disposed between the polarization layer and the reflective layer, wherein retardation value ReF of the phase retardation layer is selected to be approximately equal to a (1/4+K/2)th multiple of wavelength λ of the incident light (where K is an integer not smaller than 0);

product d1×Δn1 of thickness d1 and optical anisotropy Δn1 of the liquid crystal layer is selected to be approximately equal to a (1/2+L/2)th multiple of the wavelength λ of the incident light (where L is an integer not smaller than 0); and crossing angle Δφ between an absorption axis of the polarization layer and a retardation axis of the phase retardation layer is selected to be larger than 0° and smaller than 45°, or larger than 45° and smaller than 90° to deviate from 45° by a small amount to provide an improved contrast.

2. The liquid crystal display device of claim 1, wherein the phase retardation layer is disposed between the liquid crystal layer and the polarization layer, and the incident light passed through the polarization layer and the phase retardation layer is in a state of elliptical polarization which is close to circular polarization.

3. The liquid crystal display device of claim 1, wherein the crossing angle Δφ between the absorption axis of the polarization layer and the retardation axis of the phase retardation layer is selected to fall within a range of 40°±3°.

4. The liquid crystal display device of claim 1, wherein the liquid crystal layer is formed as a super twisted nematic layer, the twist angle of liquid crystal molecules in the liquid crystal layer is selected to be 180° or larger, and the product d1×Δn1 of the thickness d1 and optical anisotropy Δn1 of the liquid crystal layer, in the case where the wavelength λ of the incident light is 550 nm, is selected to be larger than 760 nm and smaller than 860 nm.

5. The liquid crystal display device of claim 1, wherein the liquid crystal layer is formed as a super twisted nematic layer, the twist angle of liquid crystal molecules in the liquid crystal layer is selected to be 180° or more, and the product d1×Δn1 of the thickness d1 and optical anisotropy Δn1 of the liquid crystal layer, when the wavelength λ of the incident light is 550 nm, is selected to fall within a range of 770 nm to 856 nm.

6. The liquid crystal display device of claim 1, wherein the liquid crystal layer is formed as a super twisted nematic layer, the twist angle of liquid crystal molecules in the liquid crystal layer is selected to be 180° or larger, and the retardation value ReF of the phase retardation layer, when the wavelength λ of the incident light is 550 nm, is selected to be larger than 360 nm and smaller than 450 nm.

7. The liquid crystal display device of claim 1, wherein the liquid crystal layer is formed as a super twisted nematic layer, the twist angle of liquid crystal molecules in the liquid crystal layer is selected to be 180° or larger, and the retardation value ReF of the phase retardation layer, when the wavelength λ of the incident light is 550 nm, is selected to fall within a range of 365 nm to 445 nm.

8. The liquid crystal display device of claim 1, wherein the liquid crystal layer is formed as a super twisted nematic layer, the twist angle of liquid crystal molecules in the liquid crystal layer is selected to be 180° or larger, and crossing angle θ between the orientation direction of liquid crystal molecules lying closest to the reflective layer and the absorption axis of the polarization layer is selected to fall within a range of −10° to +10°.

9. The liquid crystal display device of claim 1, wherein the phase retardation layer is a uniaxially oriented film.

10. The liquid crystal display device of claim 1, further comprising:

two substrates sandwiching the liquid crystal layer therebetween, wherein the reflective layer is disposed between the liquid crystal layer and either one of the two substrates.

11. The liquid crystal display device of claim 1, further comprising:

a scattering layer for scattering light, which is disposed on the side of the liquid crystal layer closest to the polarization layer, wherein the side of the reflective layer closest to the liquid crystal layer is planarized.

12. The liquid crystal display device of claim 11, wherein the phase retardation layer is disposed between the polarization layer and the liquid crystal layer, and the scattering layer is disposed between the phase retardation layer and the liquid crystal layer.

13. The liquid crystal display device of claim 1, wherein the reflective layer is a light-semitransmitting layer which reflects only a portion of incoming light and allows the remaining portion thereof to pass through.

14. The liquid crystal display device of claim 13, further comprising:

a circular polarization selecting layer for selectively transmitting only a circular polarization component of the incident light, the circular polarization selecting layer being disposed on the side of the liquid crystal layer closest to the reflective layer.

15. The liquid crystal display device of claim 14, wherein the circular polarization selecting layer comprises a quarter wave layer and a polarization layer for transmitting therethrough only a linearly polarized component of incident light and polarized in a predetermined direction, and the quarter wave layer is disposed between the polarization layer and the liquid crystal layer.

16. The liquid crystal display device of claim 14, wherein the circular polarization selecting layer is a circular polarization selective reflecting layer which reflects either a right-hand circularly polarized component or a left-hand circularly polarized component of the incident light and allows the other component to pass therethrough.

* * * * *